(12) United States Patent
Crocker

(10) Patent No.: US 8,922,093 B2
(45) Date of Patent: Dec. 30, 2014

(54) AXIAL FLUX MOTOR AND GENERATOR ASSEMBLIES

(75) Inventor: Timothy Richard Crocker, Devon (GB)

(73) Assignee: Scimar Engineering Ltd., Exeter, Devon (GB)

( * ) Notice: Subject to any disclaimer, the term of this patent is extended or adjusted under 35 U.S.C. 154(b) by 549 days.

(21) Appl. No.: 13/133,325

(22) PCT Filed: Dec. 16, 2009

(86) PCT No.: PCT/GB2009/002898
§ 371 (c)(1), (2), (4) Date: Aug. 16, 2011

(87) PCT Pub. No.: WO2010/070285
PCT Pub. Date: Jun. 24, 2010

(65) Prior Publication Data
US 2011/0291511 A1    Dec. 1, 2011

(30) Foreign Application Priority Data

Dec. 18, 2008    (GB) .................................. 0822992.4

(51) Int. Cl.
*H02K 3/26*    (2006.01)
*H02K 1/06*    (2006.01)
(Continued)

(52) U.S. Cl.
CPC .. *H02K 3/18* (2013.01); *H02K 1/14* (2013.01);
(Continued)

(58) Field of Classification Search
USPC .............. 310/177, 219, 268, DIG. 6; 336/123
See application file for complete search history.

(56) References Cited

U.S. PATENT DOCUMENTS 294,043 A * 2/1884 Hochhausen ................ 310/40 R
514,907 A * 2/1894 Brush ............................ 310/268
(Continued)

FOREIGN PATENT DOCUMENTS

EP    2270962 A1 * 5/2011 ............. H02K 17/14
JP    36-19906 B    11/1956
(Continued)

OTHER PUBLICATIONS

Great Britain's Intellectual Property Office's Jun. 19, 2013 Examination Report corresponding to Application No. GB0822992.4.
(Continued)

*Primary Examiner* — Burton Mullins
(74) *Attorney, Agent, or Firm* — Husch Blackwell LLP

(57) ABSTRACT

An axial flux motor assembly (10) comprises a stack of first and second discs (20a, 20b) arranged alternately such that there is a gap allowing rotation between each disc (20a, 20b). The first disc (20a) is mounted on a rotatable shaft (40), while the second disc (20b) is fixed in position. The first and second discs (20a, 20b) each comprise sectors (200) of magnetic material arranged on a face of the disc (20a, 20b), between each of which sectors (200) is a radially-extending conductor (202) of a conductive path (201) for conducting electric current. The sectors (200) of magnetic material on the first and second discs (20a, 20b) are arranged at a constant angular pitch, but the pitch of the sectors of magnetic material on the first disc may or may not be the same as those on the second disc. When electric current flows in the conductors (202), magnetic flux runs perpendicular to the faces of the discs (20a, 20b) in axially-extending flux paths (220), such that, considering the first disc(s) independently of the second disc(s), the magnetic flux in one axially-extending flux path (220) runs in an opposite direction to that in the immediately-adjacent flux paths (220) on each side of it, and is returned by flux return portions (30) of magnetic material provided at each end of the assembly (10). The total flux is the superposition of the flux of the first disc(s) and the second disc(s). The assembly (10) further comprises switching circuitry (50) for reversing the direction of current flowing in the conductive path (201) in one of the first disc (20a) or the second disc (20b) in correspondence to rotation thereof relative to the other of the first disc or the second disc in such a way as to effect continuous rotation of the first disc.

18 Claims, 31 Drawing Sheets

(51) Int. Cl.
*H02K 1/22* (2006.01)
*H02K 19/02* (2006.01)
*H02K 19/16* (2006.01)
*H02K 3/18* (2006.01)
*H02K 1/14* (2006.01)
*H02K 1/24* (2006.01)
*H02K 3/28* (2006.01)
*H02K 19/04* (2006.01)
*H02K 19/22* (2006.01)
*H01F 38/18* (2006.01)
*H01F 38/14* (2006.01)

(52) U.S. Cl.
CPC . *H02K 1/24* (2013.01); *H02K 3/28* (2013.01); *H02K 19/04* (2013.01); *H02K 19/22* (2013.01); *H01F 38/18* (2013.01); *H01F 2038/143* (2013.01); *Y10S 310/06* (2013.01)
USPC .................. 310/268; 310/114; 310/DIG. 6

(56) References Cited

U.S. PATENT DOCUMENTS

| | | | | |
|---|---|---|---|---|
| 534,953 | A * | 2/1895 | Eikenmeyer | 310/40 R |
| 3,017,553 | A * | 1/1962 | Homan | 318/737 |
| 3,226,586 | A * | 12/1965 | Henry-Baudot | 310/216.002 |
| 3,543,066 | A * | 11/1970 | French | 310/186 |
| 4,319,152 | A * | 3/1982 | van Gils | 310/201 |
| 4,959,578 | A * | 9/1990 | Varga | 310/268 |
| 6,049,149 | A | 4/2000 | Lin et al. | |
| 6,310,417 | B1 * | 10/2001 | Hsu | 310/112 |
| 2005/0035678 | A1 | 2/2005 | Ward et al. | |
| 2005/0224642 | A1 | 10/2005 | Sullivan | |
| 2006/0226727 | A1 | 10/2006 | Bramson et al. | |
| 2008/0129136 | A1 | 6/2008 | Abe et al. | |
| 2008/0265816 | A1 | 10/2008 | Takeuchi et al. | |

FOREIGN PATENT DOCUMENTS

| | | | |
|---|---|---|---|
| JP | 06-253513 A | 9/1994 | |
| JP | 8-320386 | 12/1996 | |
| JP | 2008-295284 A | 12/2008 | |
| WO | 2009135024 A2 * | 11/2009 | H02K 17/42 |
| WO | WO 2010/070285 A3 | 6/2010 | |

OTHER PUBLICATIONS

English translation of abstract of JP 8320386 (A), Dec. 3, 1996.
PCT International Search Report corresponding to International Application No. PCT/GB2009/002898, mailed Nov. 30, 2010.
PCT Written Opinion of the International Searching Authority corresponding to International Application No. PCT/GB2009/002898, mailed Nov. 30, 2010.
Jan. 27, 2014 Office Action corresponding to Japanese Patent Application No. 2011-541580.
English translation of Jan. 27, 2014 Office Action corresponding to Japanese Patent Application No. 2011-541580.
English translation of abstract of JP 2008-295284 A, Dec. 4, 2008.
English translation of abstract of JP 06-253513 A, Sep. 9, 1994.

\* cited by examiner

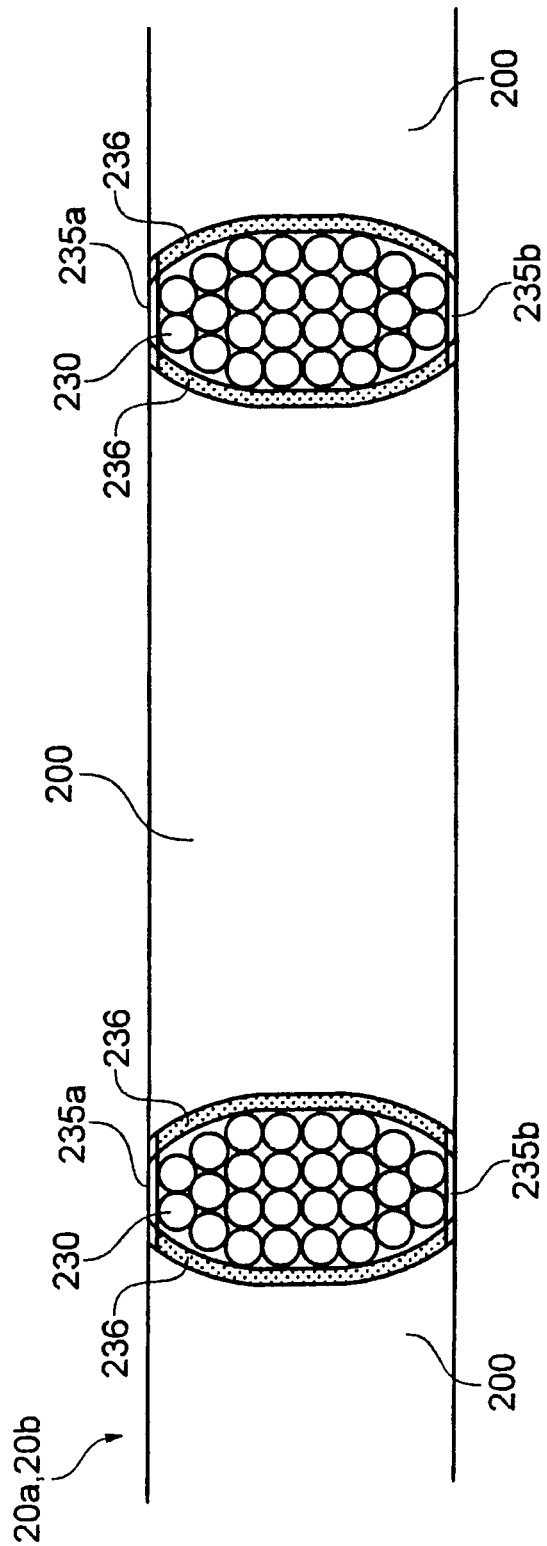

AXIAL FLUX MOTOR AND GENERATOR ASSEMBLIES

The present invention relates to axial flux motor and generator assemblies, suitable particularly for use with modern electric and hybrid road vehicles.

Most current hybrid vehicles are of the 'parallel' type, where both electric and mechanical drives are fed to the wheels. This allows the electrical drive to perform adequately in city motoring where the slopes are not excessive, with the mechanical drive available to cope with more severe hills and acceleration needs.

Pure electric vehicles and series hybrids, by definition, need to be able to cope with all inclines with purely electrical motor drive. There is also an understanding that weight can be saved by doing away with as much of the mechanical transmission as possible, and this may advantageously be achieved by having a separate motor driving each driven wheel. A given vehicle will have a given total motor mass, and so this is more evenly distributed if all wheels are driven, allowing a further reduction in structural mass. 'Free' handling benefits can then be realised with fast electronic control, such as anti-yaw and anti-spin control to add to ABS and distributed braking force systems that have already demonstrated advantage. If each wheel is driven then it is advantageous that the electrical motor drive is without any reduction gearing: gear noise is intrusive if not masked by internal combustion engine noise, and any mechanical failure in a reduction gear may lead to an accident. So the design aim becomes one of the simplicity of direct gear-less drive.

Most types of electric motor can produce more power at a higher speed, simply because there is a limit to the torque that can be produced for a given mass of electrically conducting and magnetic material, so the power is proportional to rotational speed. The upper limit to this power occurs either when mechanical stresses due to the rotational speed become excessive, or the losses, which are to some extent proportional to rotational speed, become unacceptable.

Road wheel rotational speeds are modest by comparison to the speeds that motors can run at. The torque that is required is defined by the higher of desired acceleration and required hill climbing specification at full vehicle load (which may include towing). Acceleration requirements depend on the class of vehicle being designed, for example in sports cars acceleration requirements will exceed those for hill climbing. However, high acceleration or braking loads can only occur for short periods of time, and generally the requirement to climb hills will be the more onerous design consideration because hill climbing needs to be sustained.

Electric traction motors are generally of a type that have a capability to deliver nearly constant torque right across their rated speed range. Motors for direct gear-less drive of road wheels will thus have a theoretical ability to deliver peak torque all the way to full speed. However, theoretically such motors would have very high powers at full rotation speed, which would stretch the ability of energy storage and control systems. Thus it is likely that most vehicles will be constrained to an envelope, typified by FIG. 1, in which the peak torque is available to the point where it intersects the design peak power curve. At higher rotational speeds the motor controllers would then limit the vehicle to some performance envelope, shown in FIG. 1 as a simple constant power curve.

Gearless drive motors are designed to meet this peak torque requirement, and are thus oversized for all other aspects of motoring. This is an acceptable cost when set against all the other gains, especially as more than compensating weight losses will result from the absence of conventional transmissions. Lighter motors and lighter vehicles can be obtained if a fixed reduction gear is used, however for the purposes of what follows it is to be understood that it is desirable to obtain motors with the highest torque to mass ratio, sufficient to be used as gearless drive motors, but also applicable to geared designs if that is a vehicle design aim.

There are many motor types in use for traction purposes, including DC, Induction and Switched Reluctance, which are distinct from each other in important principles of operation. This invention introduces a new category of motor, made distinct by its fundamental operating principle. It is best understood by comparison to the prior art.

In the simplest two pole permanent magnet (PM) DC motor, as shown in FIG. 2, a permanent magnetic field B is applied radially between magnetic pole pieces 3 across a gap between a stator 1 and a rotor 2, and conductors 4 running axially along the rotor 2 are fed current I via a commutator (not shown). Current and magnetic field are at right angles and so a tangential force is generated. The magnetic properties of magnets and air are such that it is relatively simple to get a flux that is close to the saturation flux of the rotor iron across the gap, so there is a practical but easily achieved upper limit to flux density. The currents can take up only a small part of the radial depth of the rotor, and heat generation in the windings is the practical limit, so the interaction of current and magnetic field is limited by geometric considerations and material properties.

PM DC motors have essentially linear relationships between electrical and mechanical properties because the strength of the magnetic field is nearly constant: the motor 'back e.m.f.' is almost directly proportional to rotational speed, and torque is proportional to current, until some limit is reached. Whilst PM motors can have high torque to weight ratios and are simple, these fixed properties put demands on the electronic controllers: they have to produce very high currents at low voltages for starting, acceleration and hill climbing, and high voltages at low current for high speed cruising.

Various field weakening techniques are known, such as that disclosed in GB2338117, which result in maximum flux density at low speed, but a diminishing flux density at higher speed.

The other established solution to this problem is by use of field wound motors. Here the magnetic field is produced by an electro-magnet, and the torque is generated by the interaction of the armature conductor currents with this field, in exactly the way as described for PM motors. Here the field winding current can be reduced when only low torque is required, and this has the effect of reducing the motor back e.m.f. at high rotational speeds. Whilst this gives a greater degree of control than with speed-related field weakening, it is not favoured in battery-powered vehicles as the energy used in the field winding is simply lost.

A principle of the present invention will now be explained in comparison to the prior art with reference to FIGS. 3 and 4. FIG. 3A shows the force on a conductor carrying a current in the field produced by a permanent magnet, and FIG. 3B shows the force on a conductor in the field produced by an electro-magnet, which are clearly the same. FIG. 4 by comparison shows the force between two parallel wires in a medium of relative permeability $\mu_r$. The expressions below show the relationships between the current and the force per unit length.

The governing relations for FIG. 3A and FIG. 3B are as follows. The force on a conductor of length 1 carrying a current I in a magnetic field of flux density B is simply given by their product, ie $$\text{Force} = B \cdot I \cdot 1 \qquad \text{Eqn 1}$$

The current that can be carried is a function of the electrical conductivity of the conductor, its cross sectional area, its thermal conductivity and the properties of the design in being able to remove heat. The maximum flux density is determined both by the saturation flux density of any soft magnetic materials used to make the magnetic circuit, the length of the air path of the flux, and the strength of the means (permanent magnets or field windings), to generate flux.

There is a closely linked equation which states that the e.m.f. generated by a conductor moving in a field is given by $$e.m.f.(\text{Voltage}) = \text{rate of change of flux} = B \cdot l \cdot v \qquad \text{Eqn 2}$$

where B and I have the same meanings as above, and v is the velocity of the conductor through the field B in the plane perpendicular to the flux.

The voltage necessary to turn a motor at a given speed is the sum of the voltage necessary to sustain the current against the winding resistance, plus the motor 'e.m.f.' given above. Thus if resistive losses are ignored, motors can be understood to be governed by simple proportionality between two pairs of quantities, ie current and torque, and voltage and rotational speed. It can also be understood that $$\text{Power} = \text{angular speed} \cdot \text{torque} = \text{Voltage} \cdot \text{Current} \qquad \text{Eqn 3}$$

It can therefore be understood that in comparing motors, on the basis that each can operate to the same upper rotational speed, it is merely necessary to compare the torque, as a function of total mass. This is particularly useful when the application is as direct, gearless drive of road wheels, where rotational speeds are low and unlikely to exceed practical limits.

The torque of a simple DC motor design is thus directly given by the Force in Eqn 1 above, multiplied by the effective radius at which the force operates.

In either version of FIG. 3 the force per unit length is simply proportional to the field strength, whereas in FIG. 4 each current produces a field, and the force is given by considering the force on each conductor in the field of the other. If each conductor carries the same current, then the force between the two conductors is proportional to the square of the current.

The force F per unit length between two conductors carrying currents $I_1$, $I_2$ in a medium of relative permeability $\mu_r$ in S.I. units is $$F = \mu_0 \cdot \mu_r \cdot I_1 \cdot I_2 / (2 \cdot \pi \cdot r) \qquad \text{Eqn 4}$$

The explanation of the force between two wires is familiar in textbooks with the conductors in air, but the equation above shows that the force increases in a high permeability magnetic medium. It should be noted that whilst each conductor is subject to a force in the field of the other this force is essentially reciprocal, that is to say it can be calculated considering either as the current and the same answer will be given, and Equation 4 above gives the total force.

A further point should be noted: if the wires in FIG. 4 are moved relative to each other, either closer together or further apart, an e.m.f. will be generated in each as it cuts the flux of the other.

This principle can be used to make practical machines, where current controls the motor back e.m.f. and the torque is proportional to the product of two currents, but where each current is subject to a force in the field of the other, and so there is no energy lost simply in energising a field winding. The advantages of existing field wound motors are delivered without such power loss. Such motors can be conveniently termed "mutually-coupled".

Practical motors and generators are realised using high permeability soft magnetic material, motor steels (or 'irons'), with rotating and stationary magnetic parts separated by air gaps. The magnetic flux induced by a current in a particular magnetic pathway is proportional to the current and inversely proportional to the reluctance in the combined magnetic path which typically includes air gaps to allow free rotation: thus an effective permeability for any path can be calculated.

Motors and generators are known where the flux is either radial or axial, but the interaction of currents and fields is essentially equivalent in each. To realise a motor by the mutual coupling principle, axial flux machines are advantageous.

In an axial flux motor assembly of the prior art, the basic geometry is of two discs arranged to face one another, one disc carrying conductors extending radially at a constant angular pitch such that the current in the conductors follows the path in FIG. 5. The other disc has areas of permanent magnet material spaced around its face with alternate polarity and the same number of areas as there are radial "spokes" of the conductors, and magnetic flux perpendicular to the plane of the disc. Rings of soft magnetic material are placed outside the pair of discs to return the flux emerging from one axial pathway into the two neighbouring pathways with the opposite polarity. FIG. 6 shows the magnetic flux pattern with which the current of FIG. 5 can interact. It can be understood that if the radial "spokes" of the conductors are initially aligned with the centres of the magnetic field areas, in the flux emerging from the poles, and a current is passed through the conductors, then the effect, since both current direction and field strength reverse each sector, is that there will be a torque generated between the conductors and the magnetic field. Moreover if the current is passed through the conductors in the opposite direction, then the torque will be reversed. It can be further understood that this torque could generate rotation, round to the point where the conductors came to the edge of the magnetic field. It can also be seen that, by means of more than one such winding spaced in an angular sense by a fraction of the angular pitch, it is possible to enable an effectively continuous torque to be generated, ie to make a practical motor.

Motors are known in which the magnetic field is generated by a disc with magnetic areas in the pattern of FIG. 6, placed between two plates of magnetic material in which there are embedded windings of the form of FIG. 5, such as disclosed in US2003/0189388A1 and U.S. Pat. No. 6,844,656B1.

It is desirable to provide an improved axial flux motor assembly and an improved axial flux generator assembly.

According to an embodiment of a first aspect of the present invention there is provided an axial flux motor assembly comprising: a stack of first and second discs arranged alternately such that there is a gap allowing rotation between each disc, there being at least one first disc and at least one second disc in the stack; the or each said first disc being mounted so as to be rotatable, and the or each said second disc being fixed in position, wherein each of the first and second discs comprises sectors of magnetic material arranged on a face of the disc, between each of which sectors is a radially-extending section of a conductive path for conducting electric current, the sectors of magnetic material on the or each first disc being arranged at a first constant pitch, and the sectors of magnetic material on the or each second disc being arranged at a second constant pitch, where the said first and second constant pitches may or may not be equal; and wherein, when electric current flows in the said radially-extending sections of the conductive path, magnetic flux runs perpendicular to the faces of the discs in axially-extending flux paths, such that, considering the first disc(s) independently of the second disc(s), the magnetic flux in one axially-extending flux path runs in an opposite direction to that in the immediately-adjacent flux paths on each side of it, and is returned by flux return portions of magnetic material provided at each end of the assembly, the total flux being the super-position of the flux of the first disc(s) and the second disc(s); the assembly further comprising switching circuitry for reversing the direction of current flowing in the said conductive path in one of the or each first disc or the or each second disc in correspondence to rotation thereof relative to the other of the first disc(s) or the second disc(s) in such a way as to effect continuous rotation of the or each first disc.

In a conventional field wound motor, in which the control of current to the armature and the field are independent, the field winding current directly controls the flux density, up to the saturation of the soft magnetic material used. A disadvantage of the conventional field wound motor is that the electrical power used to sustain current in the field winding is simply lost, and detracts from the power efficiency of the motor. An advantage of such an arrangement, however, is that when there is a requirement for a wide motor speed range, and also a power envelope limitation, as shown by FIG. 1, it is possible to decrease the field strength when the motor is running at high speed and low load. This has the effect of reducing the motor back e.m.f., and allows the controller to have a more limited dynamic range.

An axial flux motor assembly embodying the present invention offers a significant advantage over the prior art, because the underlying principles of a field wound motor can be delivered in a design in which all currents interact with magnetic fields, and so there is no current simply 'wasted' in generating the field.

An advantage of the present invention is that the torque is proportional to the product of the two currents, and if they are the same, to the square of this current. The back e.m.f. is proportional to the product of rotational speed and the current. This is a good match to a road vehicle drive application because it maximises torque at low speed, and allows lower drive voltages at part torque and high speed, without trading any of the power efficiency at cruise speed which naturally results from building machines capable of producing high torque.

The simplest machine employing the mutually-coupled principle consists of two discs, one rotating (rotor) and one stationary (stator). Each carries conductors wound around sectors of magnetic material. Since it is the radial elements of the currents between the magnetic sectors that are important, the direction of the current in the windings must be alternating between adjacent radial conductors. The simplest representation is of a single serpentine winding as in FIG. 5, in which case it can be seen that windings need not form complete turns.

In addition to the two discs, there is at each end a flux return ring. Machines can be advantageously built using more than two discs, preferably adding a rotor and a stator each time. The discs in a set may be connected in series or parallel, or a combination, to suit the voltage and current specification.

According to an embodiment of a second aspect of the present invention there is provided an axial flux generator assembly comprising: a stack of first and second discs arranged alternately such that there is a gap allowing rotation between each disc, there being at least one first disc and at least one second disc in the stack; the or each said first disc being mounted so as to be rotatable, and the or each said second disc being fixed in position, wherein each of the first and second discs comprises sectors of magnetic material arranged on a face of the disc, between each of which sectors there is a radially-extending section of a conductive path for conducting electric current, the sectors of magnetic material on the or each first disc being arranged at a first constant pitch, and the sectors of magnetic material on the or each second disc being arranged at a second constant pitch, where the said first and second constant pitches may or may not be equal; and wherein, when electric current flows in the said radially-extending sections of the conductive paths, magnetic flux runs perpendicular to the faces of the discs in axially-extending flux paths, such that, considering the first disc(s) independently of the second disc(s), the magnetic flux in one axially-extending flux path runs in an opposite direction to that in the immediately-adjacent flux paths on each side of it, and is returned by flux return portions of magnetic material provided at each end of the assembly, the total flux being the super-position of the flux of the first disc(s) and the second disc(s); the assembly further comprising rotating means for effecting continuous rotation of the or each first disc whereby current flows in the said conductive path in one of the or each first disc or the or each second disc and reverses in direction in correspondence to rotation of the disc relative to the other of the first disc(s) or the second disc(s).

An assembly embodying the first aspect of the present invention is preferably also operable to function as a generator.

In an assembly embodying the first and/or second aspects of the present invention, when the first and second pitches are equal, the polarities of the currents flowing in adjacent sections of the conductive path when the assembly is in use are mutually opposite for all sections. When the first and second pitches are not equal, the polarities of the currents flowing in adjacent sections of the conductive path when the assembly is in use are mutually opposite for all sections except for two sections on either side of a current feed point where they are the same.

In an assembly embodying the first and/or second aspects of the present invention the magnitude of the current in the conductive path of the or each first disc is desirably the same as that of the current in the conductive path of the or each second disc.

The conductive path may be formed of a conductive winding.

Alternatively, the or each of the first and second discs may be made of electrically-conductive material and the conductive path may be formed by the disc material surrounding the sectors of magnetic material. The electrically-conductive material may be an aluminium alloy. Slots may be provided in the disc so as to define the conductive path.

In an assembly embodying the first and/or second aspects of the present invention the sectors of magnetic material may comprise holes in the disc filled with high flux density soft magnetic material. If slots are provided in the disc so as to define the conductive path, the slots may be arranged so as to interconnect with the holes.

Each of the first and second discs may have a plurality of mutually-independent conductive paths.

Electrical current may be delivered to the discs, and/or drawn from the discs, by means of inductive coupling.

In one arrangement there are two such first discs and two such second discs, forming two sets each containing a first disc and a second disc adjacent to it, each set having its own flux return portions, and one set of the first and second discs is permanently offset from the other set of the first and second discs by an amount equal to half the width of one of the said sectors.

In an alternative arrangement there are two such first discs and two such second discs and either the first discs or the second discs are provided with two separate conductive paths.

In another alternative arrangement, the number R of sectors of magnetic material on the or each first disc differs from the number S of sectors of magnetic material on the or each second disc, and the current in the conductive path of the or each first disc is reversed when the or each first disc has rotated by an angle equal to 720(1/R−1/S) degrees. For example, R may be an even number and S may be a number which is a multiple of four.

FIG. 12B shows a sectional view taken along the line Y-Y in FIG. 12A;

Figure 10:
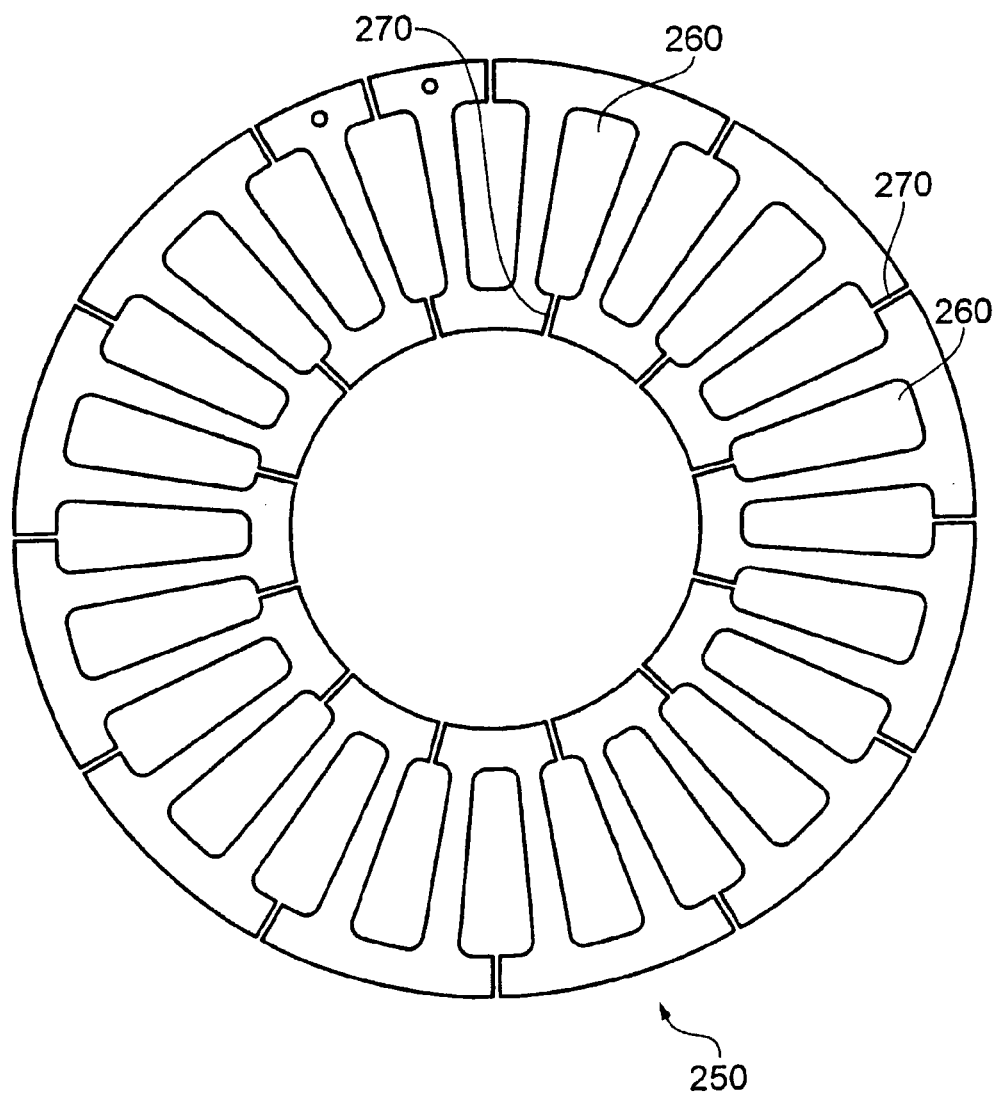
FIG. 10 shows a disc which can be used in the assembly of FIG. 7 or 9.
Figure 12A:
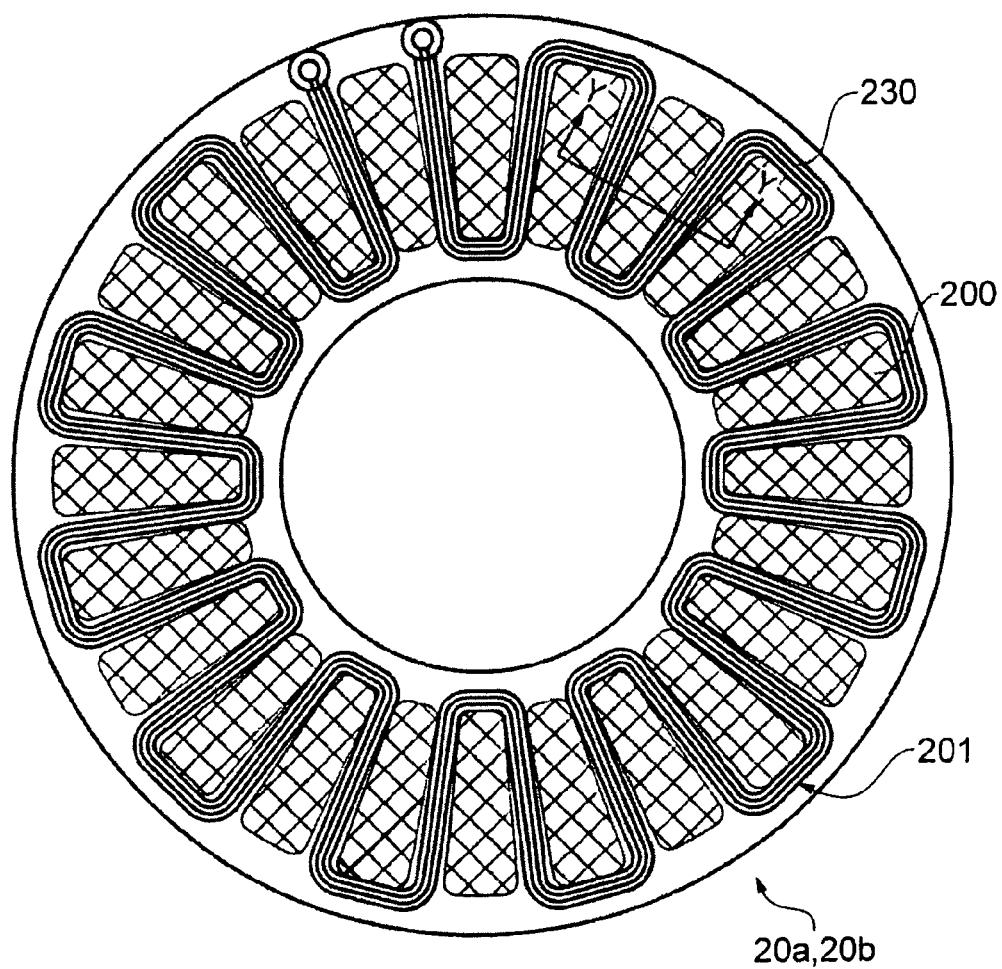
FIG. 12A shows a plan view of another disc which can be used in the assembly of FIG. 7 or 9.
Figures 13A, 13B:
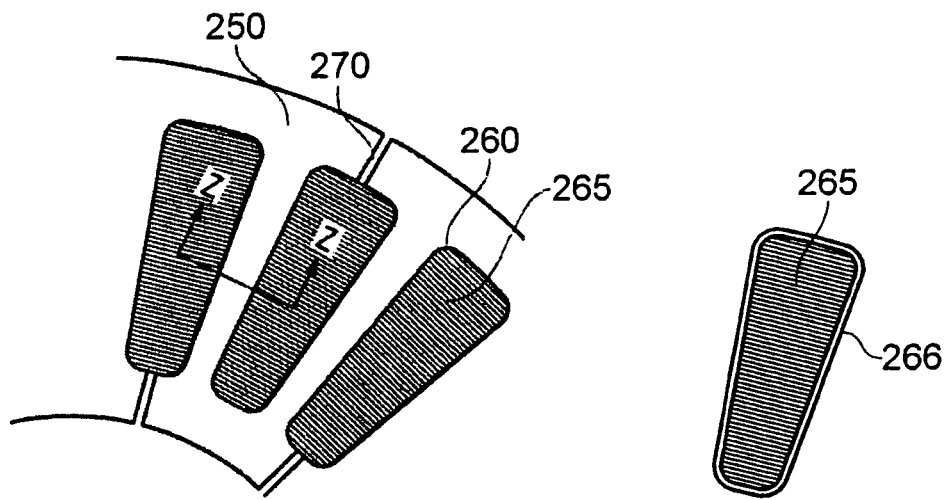
Figure 13C:
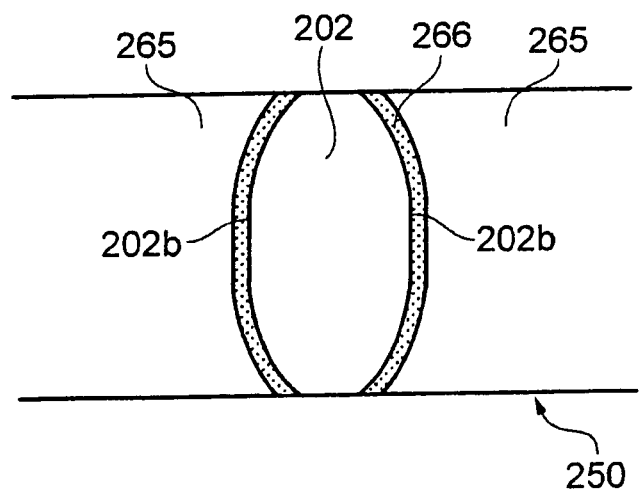
Figure 14:
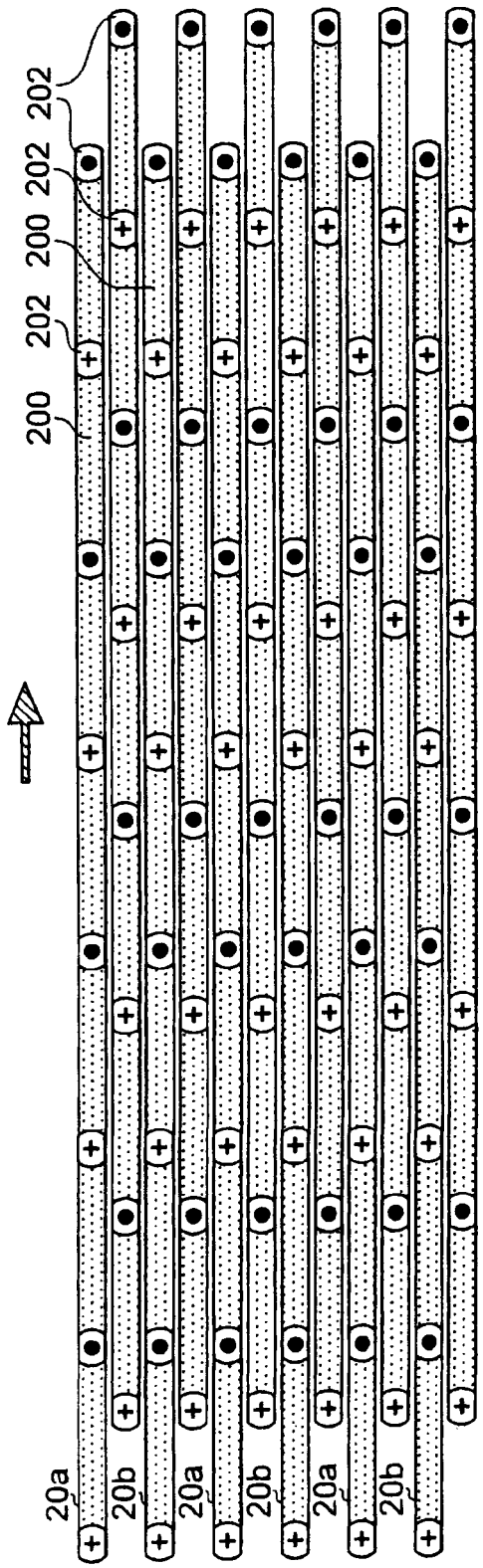
Figure 15A:
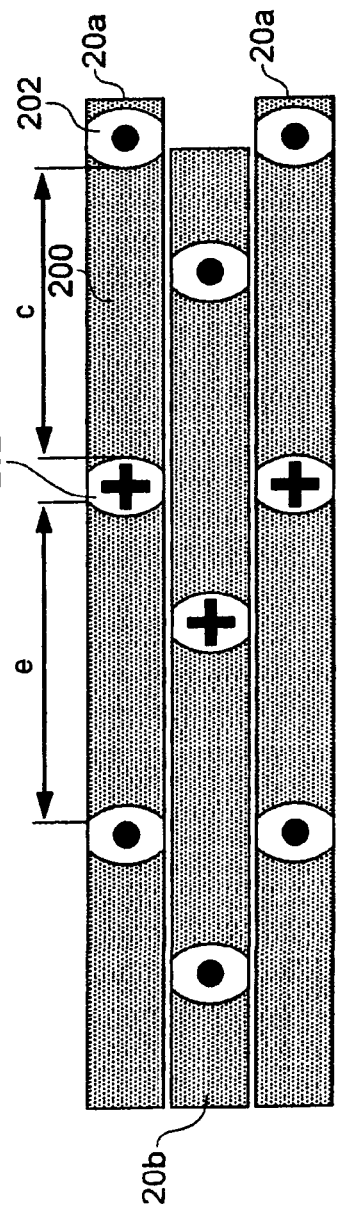
Figure 15B:
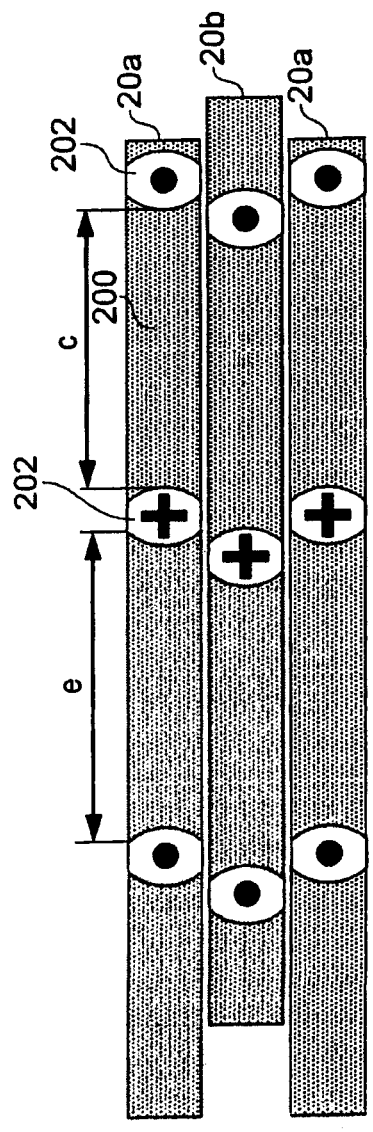
Figure 15C:
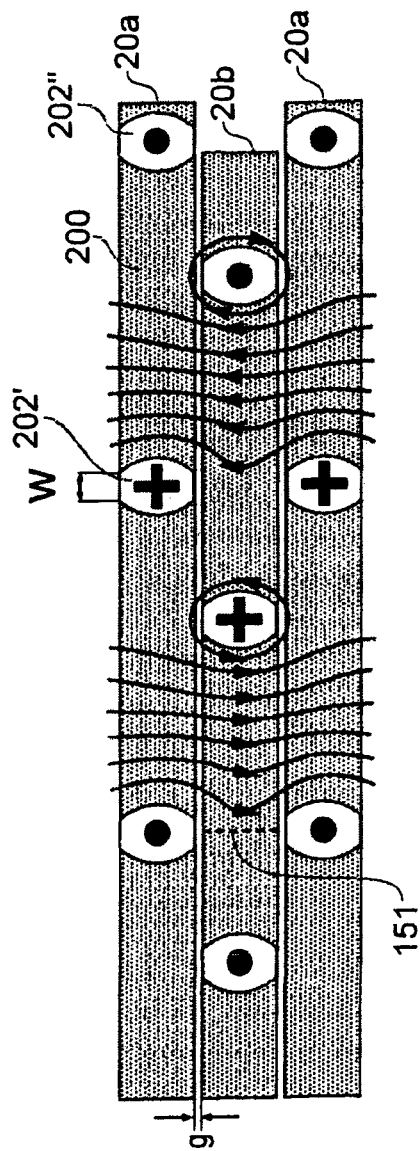
Figure 16A:
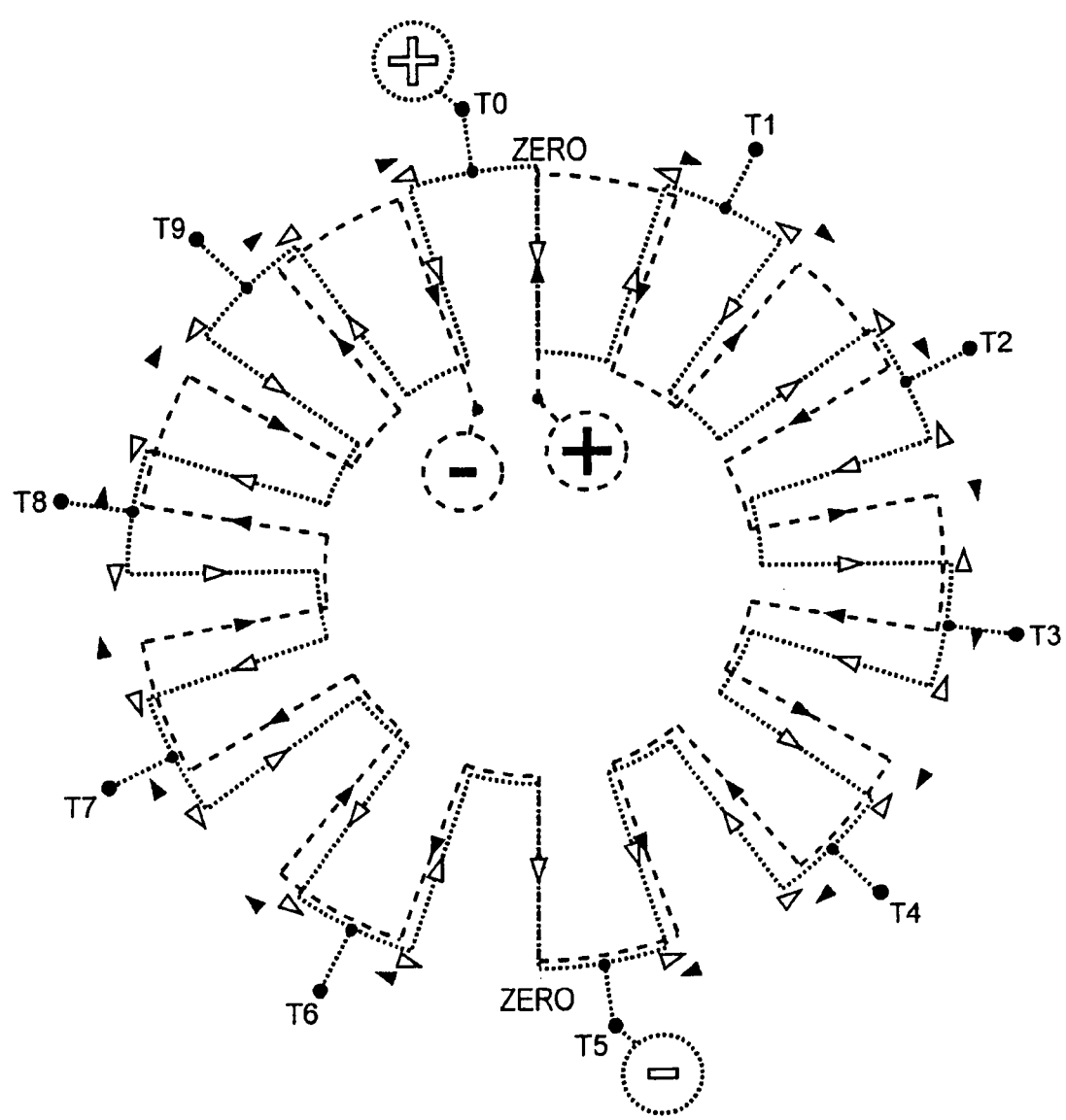
Figure 16B:
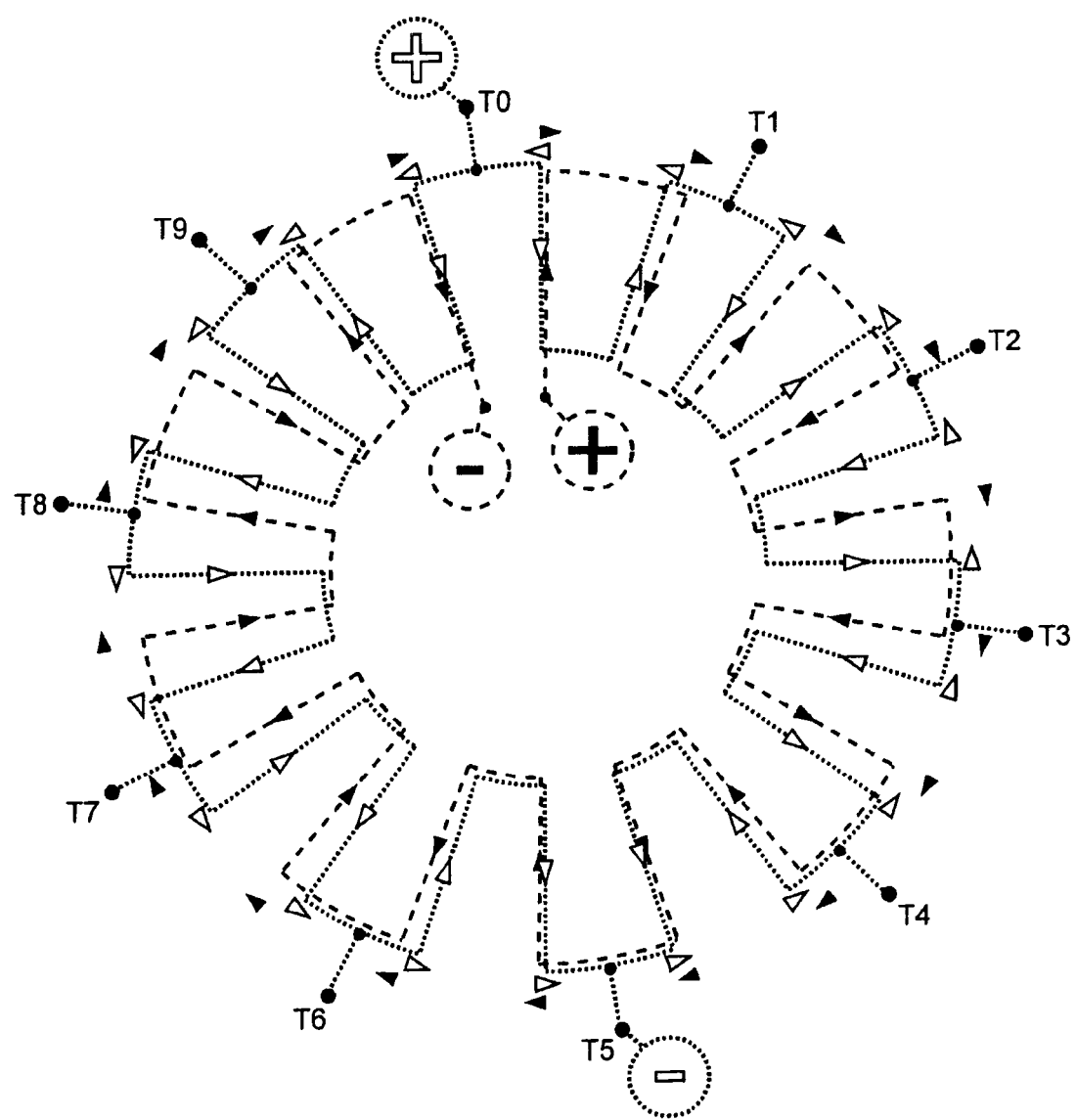
Figure 16C:
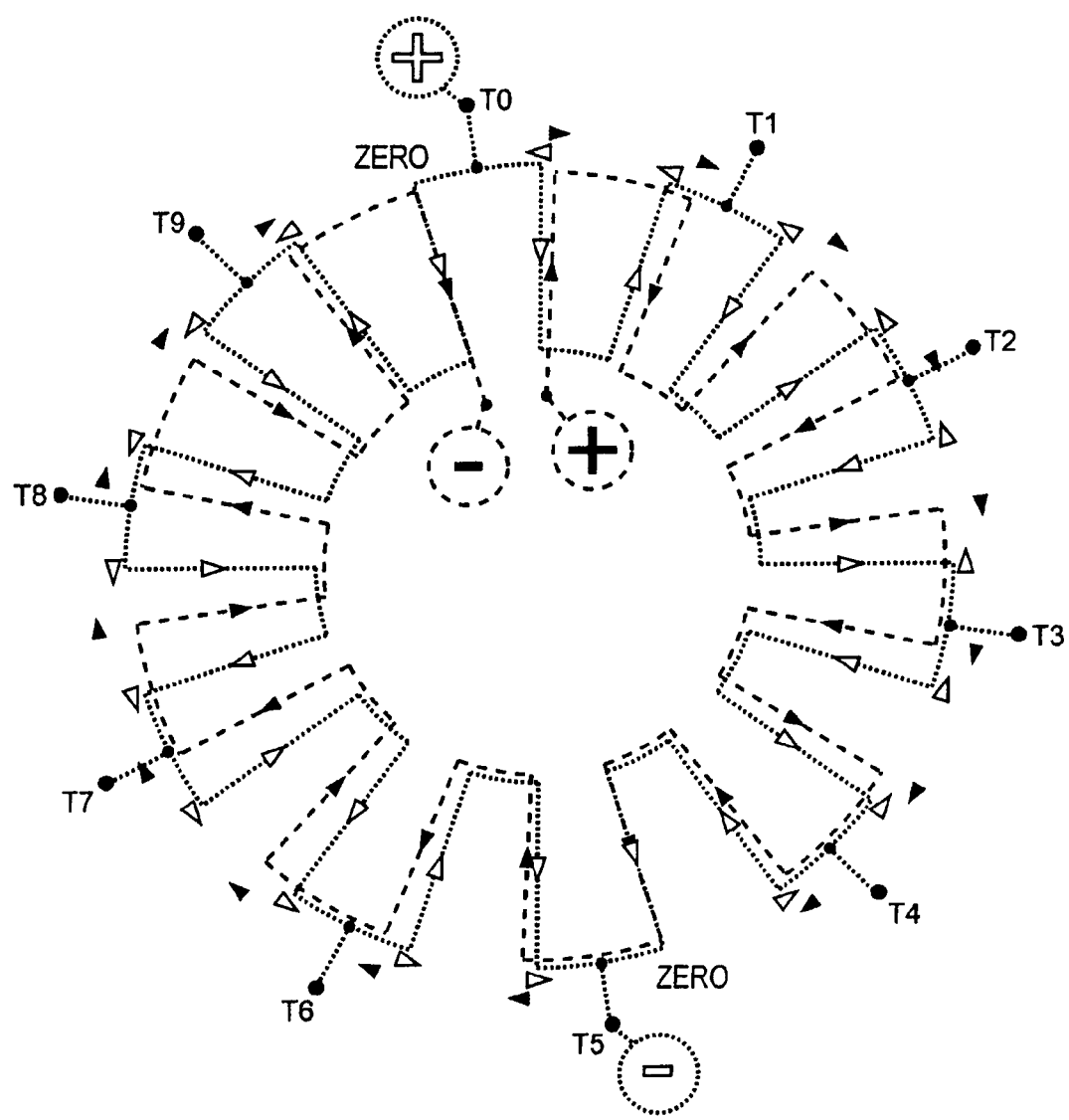
Figure 16D:
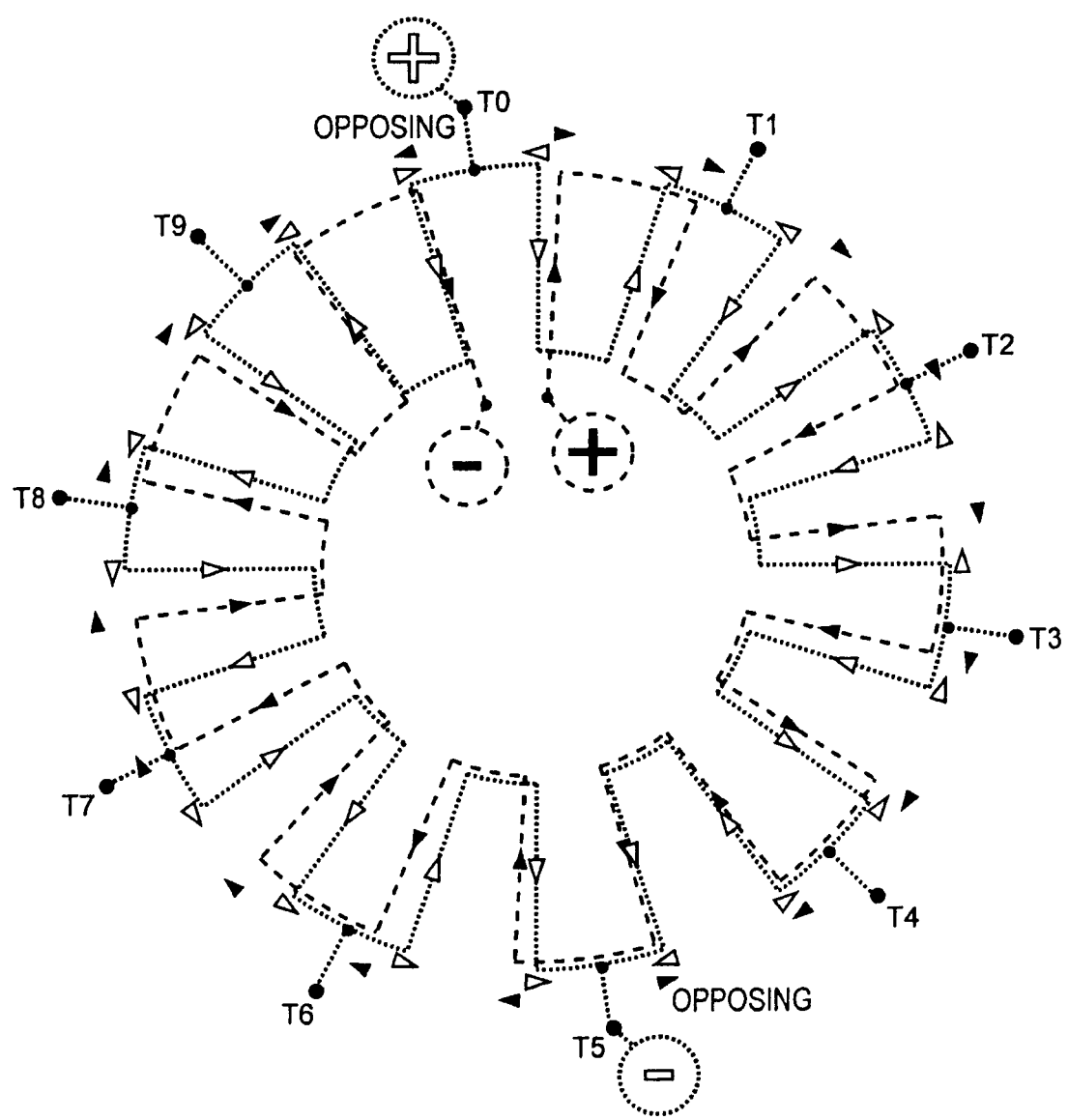
Figure 16E:
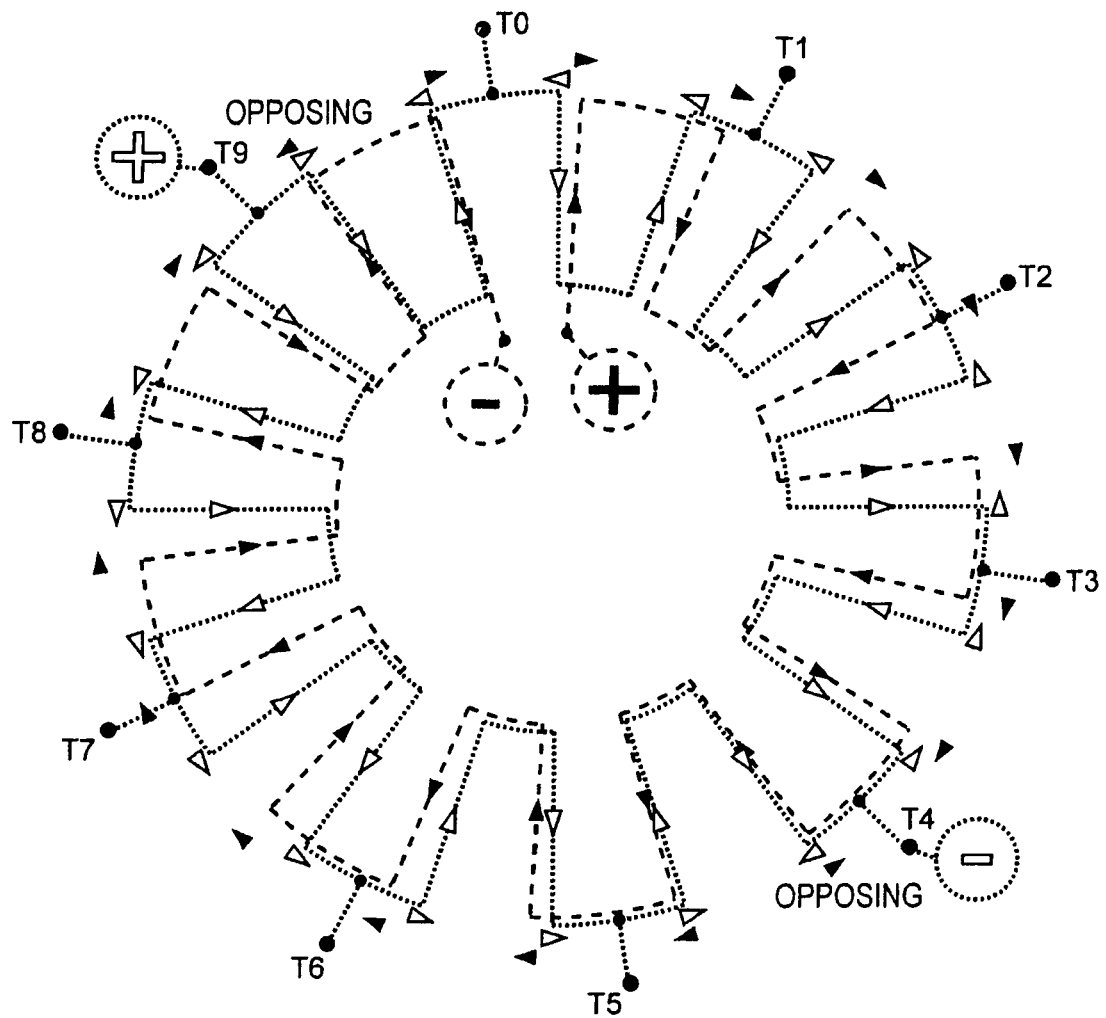
Figure 16F:
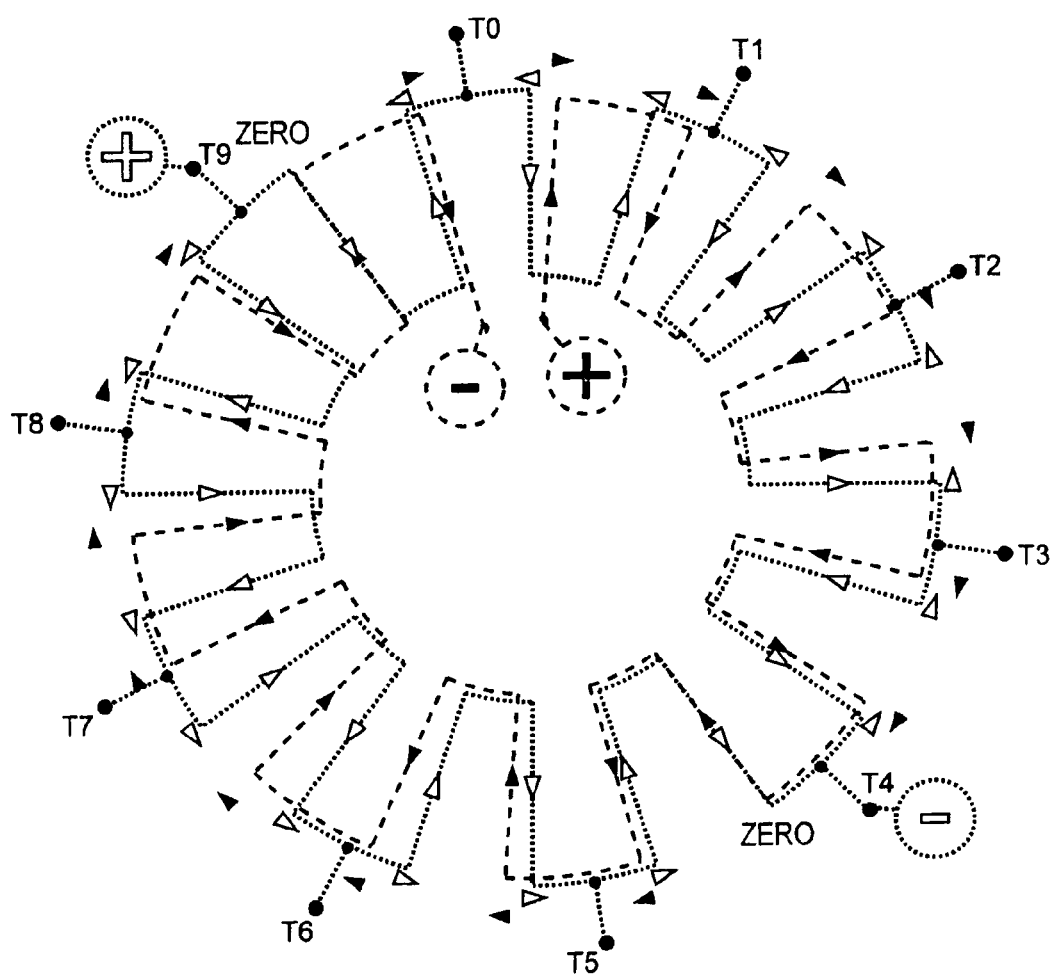
Figure 17A:
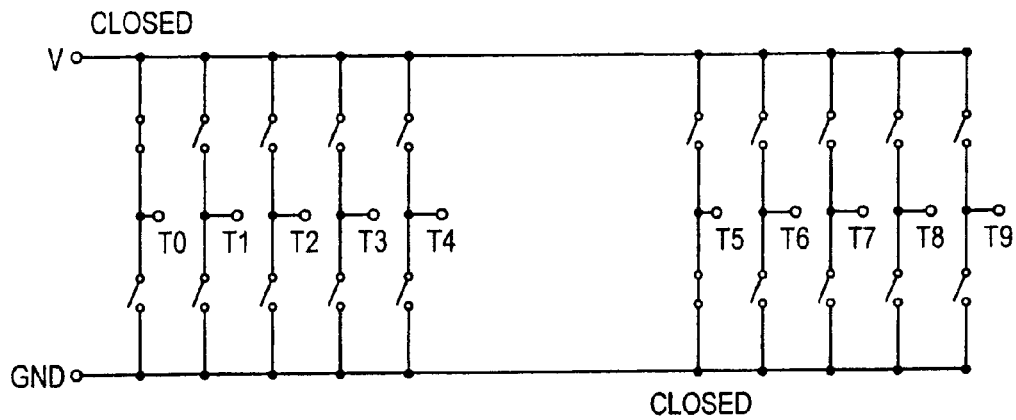
Figure 17B:
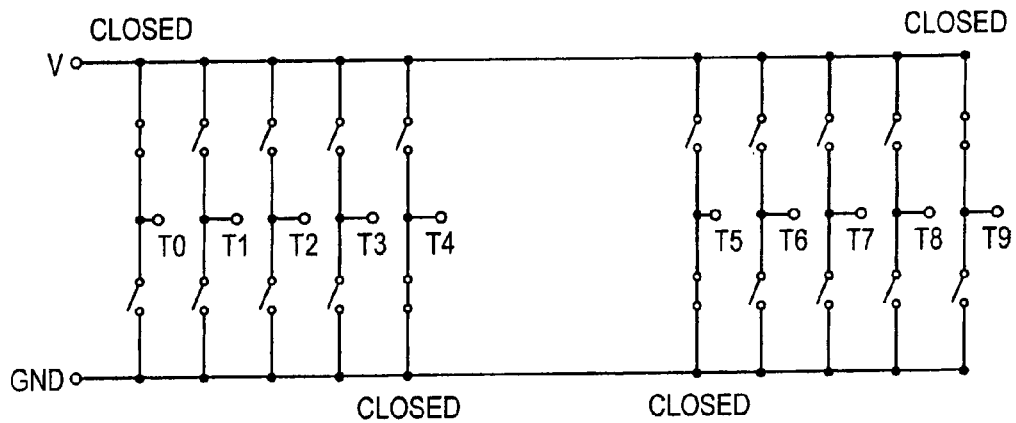
Figure 17C:
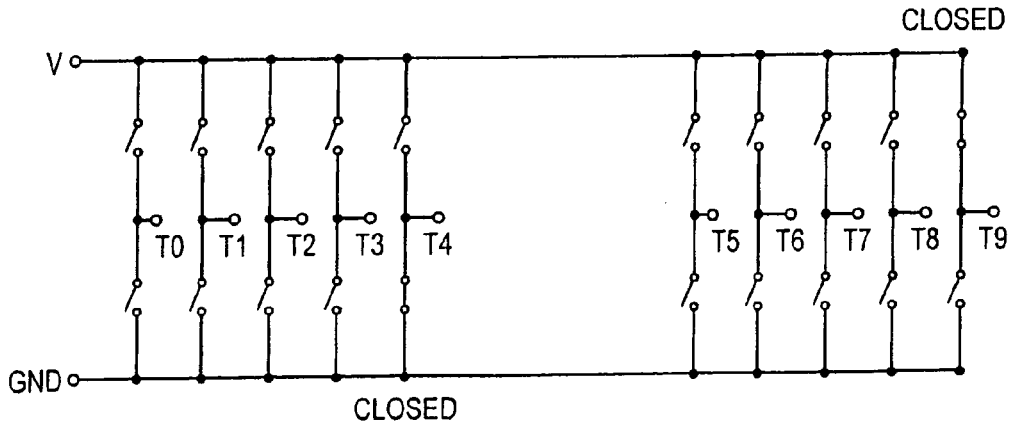
Figure 18A:
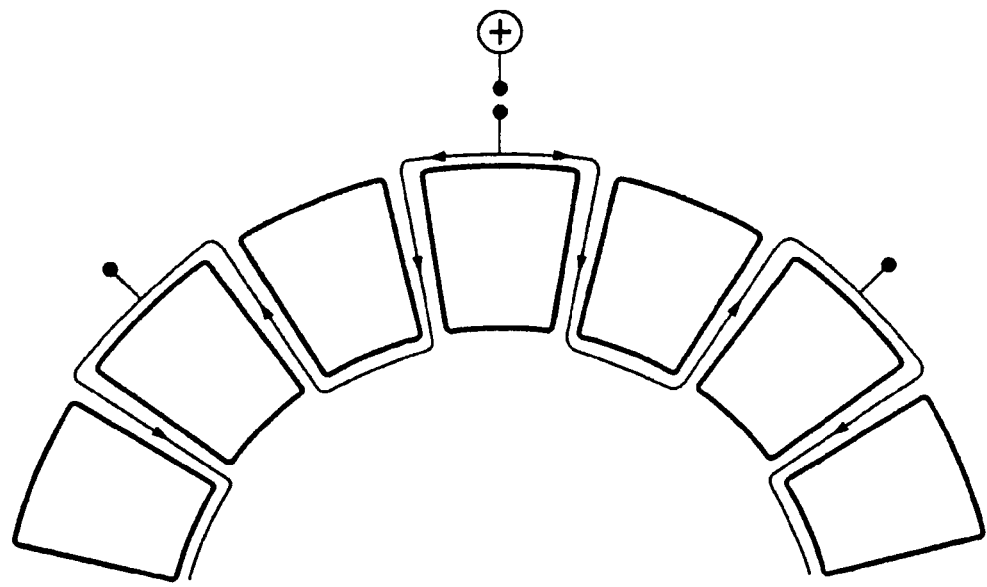
Figure 18B:
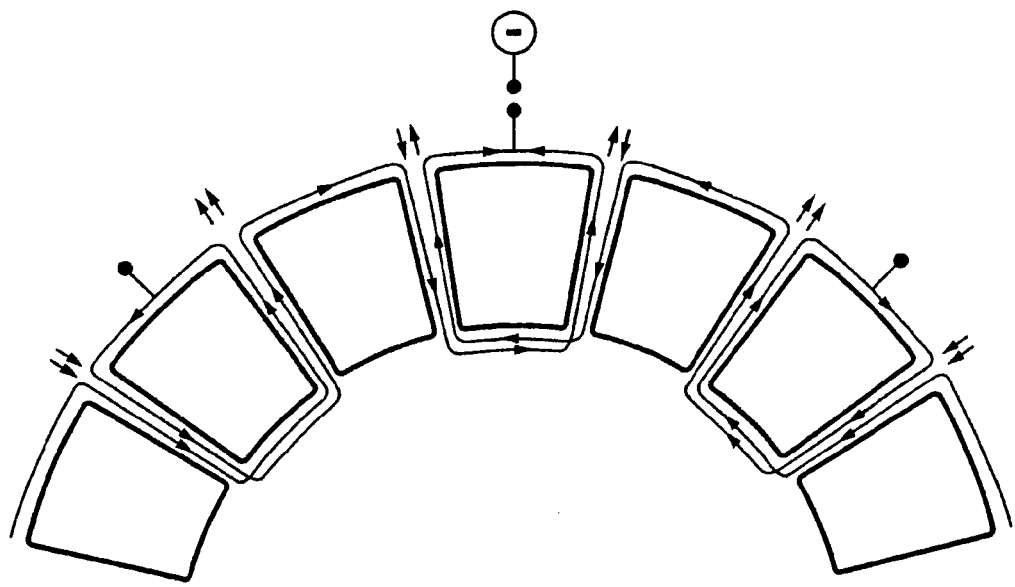
Figure 18C:
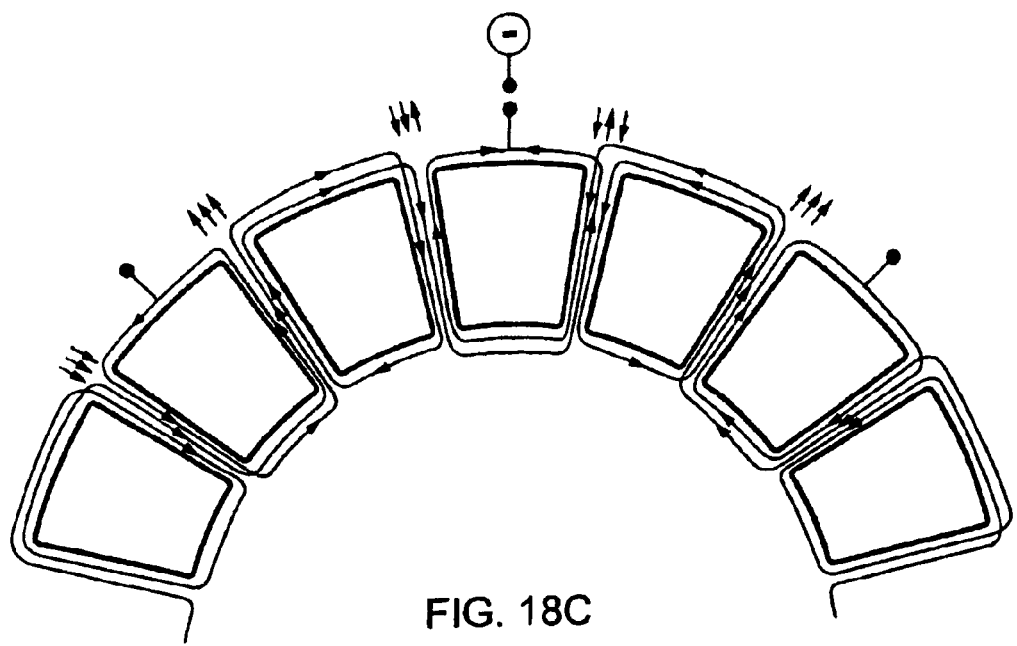
Figure 18D:
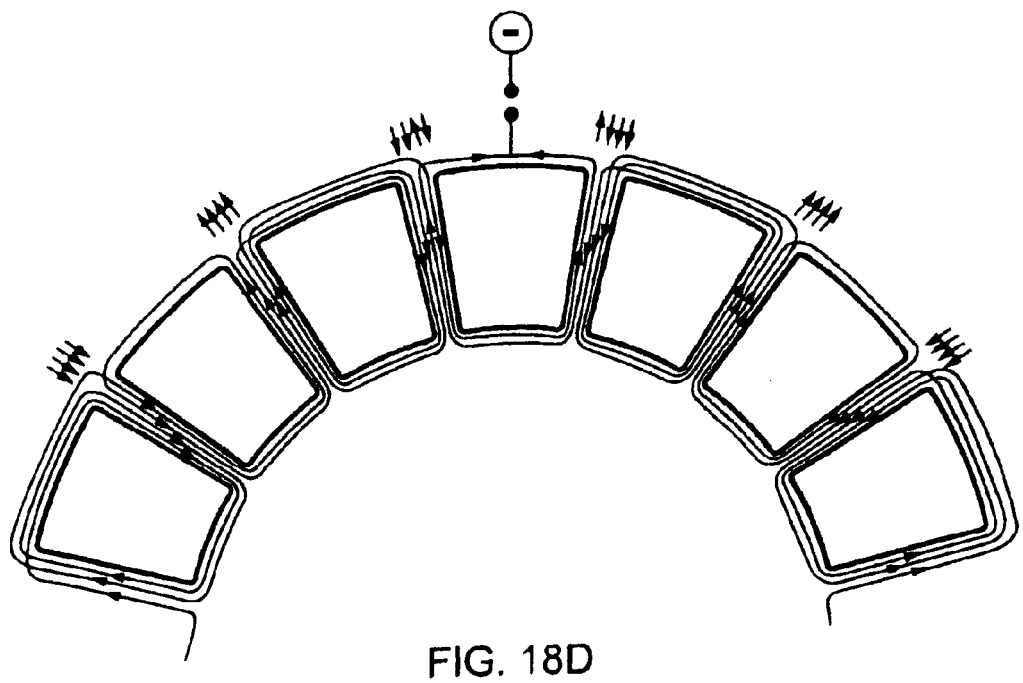
Figure 19:
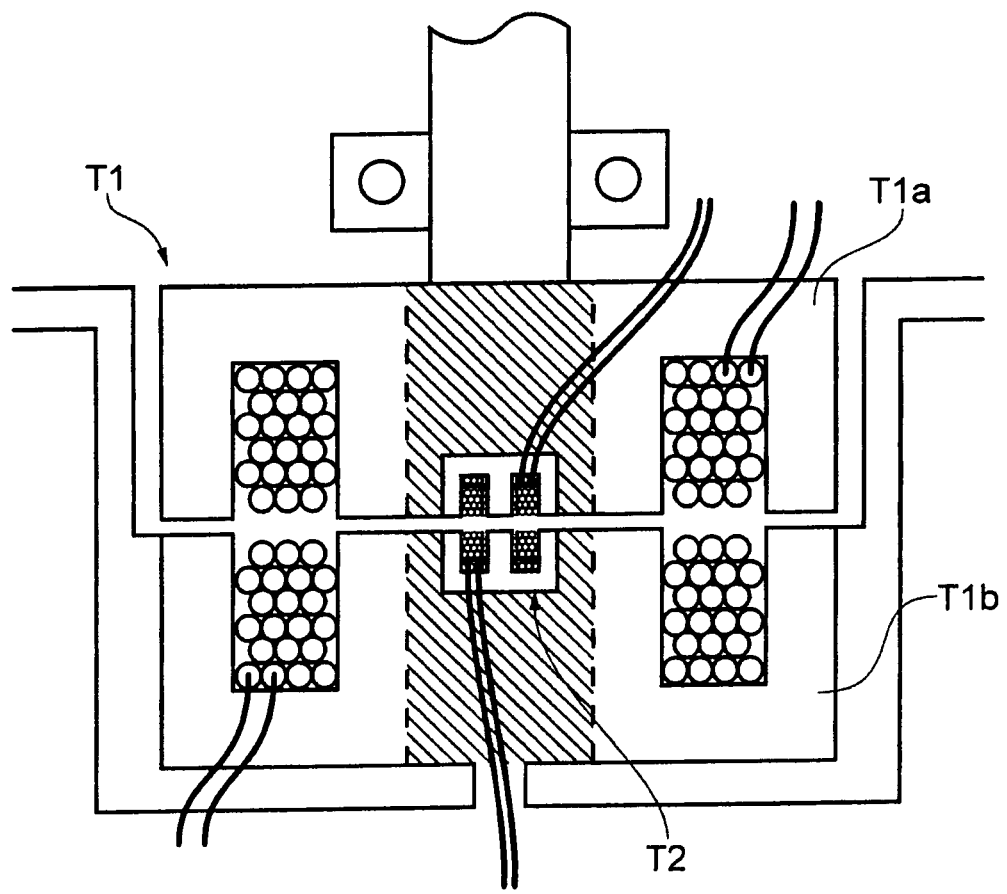
Figure 20:
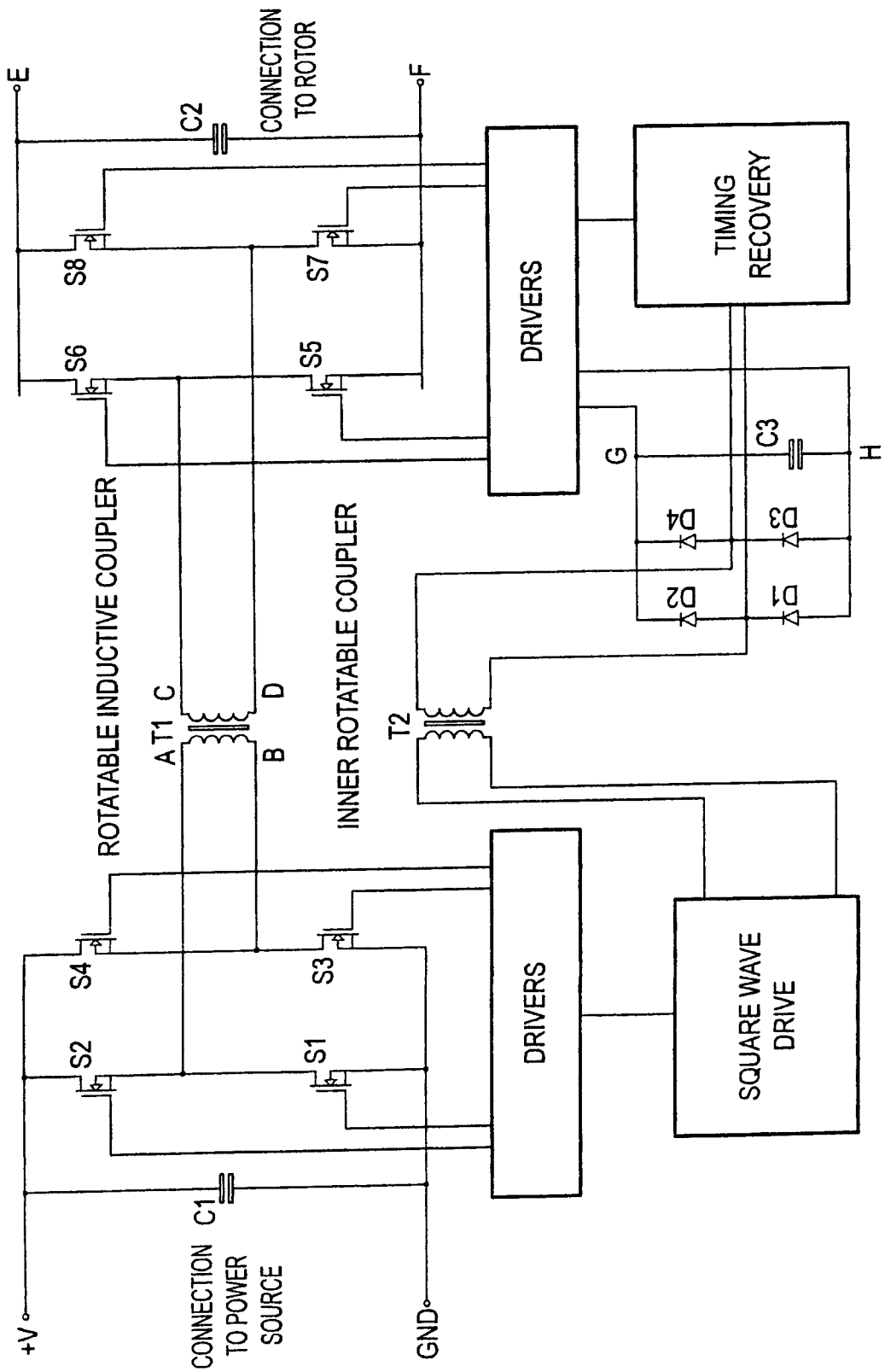
Figure 21:
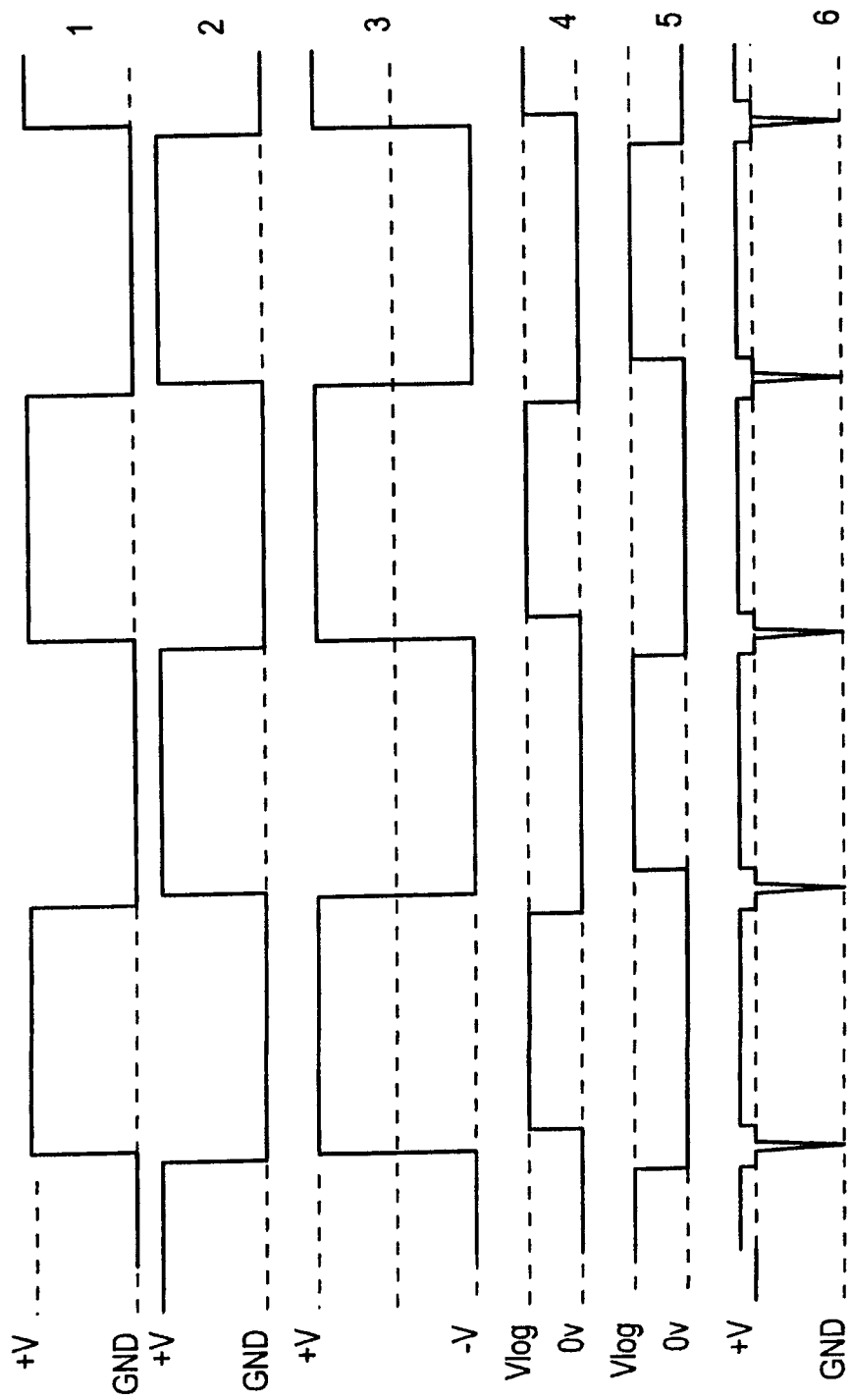

FIG. 13A shows part of the disc of FIG. 10 in more detail; FIG. 13B shows a part of FIG. 13A in further detail, FIG. 13C shows a sectional view taken along the line Z-Z in FIG. 13A, FIGS. 13D, 13E and 13F show respective views for use in explaining how part of the disc may be made, FIG. 13G illustrates another detail of FIG. 13A, and FIG. 13H is a sectional view of the disc of FIG. 12 corresponding to FIG. 13C;

FIG. 14 shows a straightened-out radial view of part of an assembly embodying the present invention;

FIGS. 15A, 15B and 15C show diagrams for use in explaining the angular relationship between discs;

FIGS. 16A to 16F show respective current diagrams;

FIGS. 17A to 17C show switching circuitry corresponding to the current diagrams of FIGS. 16A to 16F;

FIGS. 18A to 18D illustrate various winding possibilities;

FIG. 19 is a diagram of a device for use in an assembly embodying the present invention;

FIG. 20 shows a circuit for operating the device of FIG. 19;

FIG. 21 is a timing diagram of the circuit of FIG. 20; and

Figure 22:
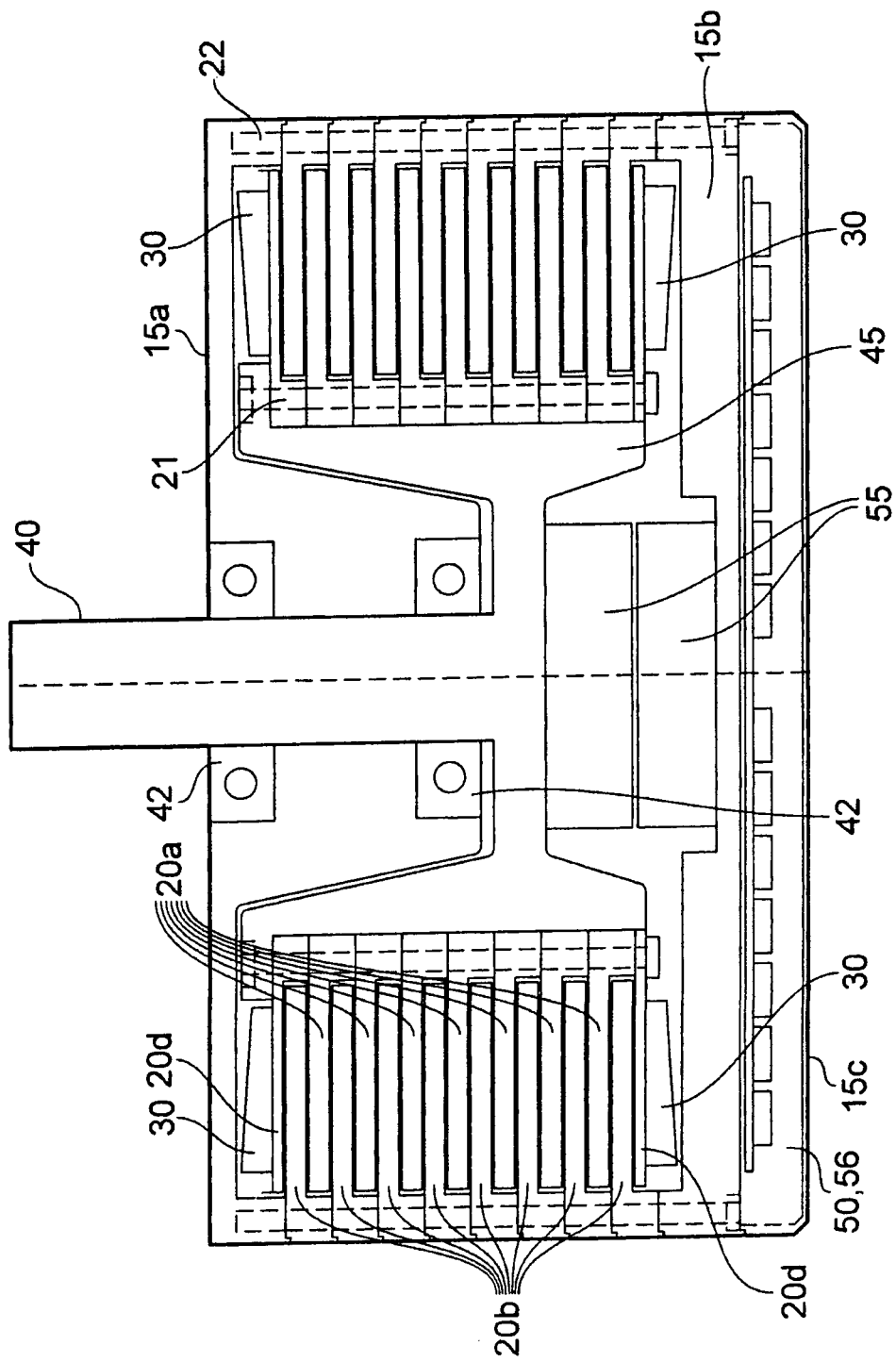

FIG. 22 is a diagram for use in explaining a method of building a motor assembly embodying the present invention.

An axial flux motor assembly embodying the first aspect of the present invention will now be described in detail, but it will be understood that an axial flux generator assembly of similar design can be made. Moreover, the axial flux motor assembly described below may be designed so as to be reversible when circumstances require its use as a generator.

Figure 7:
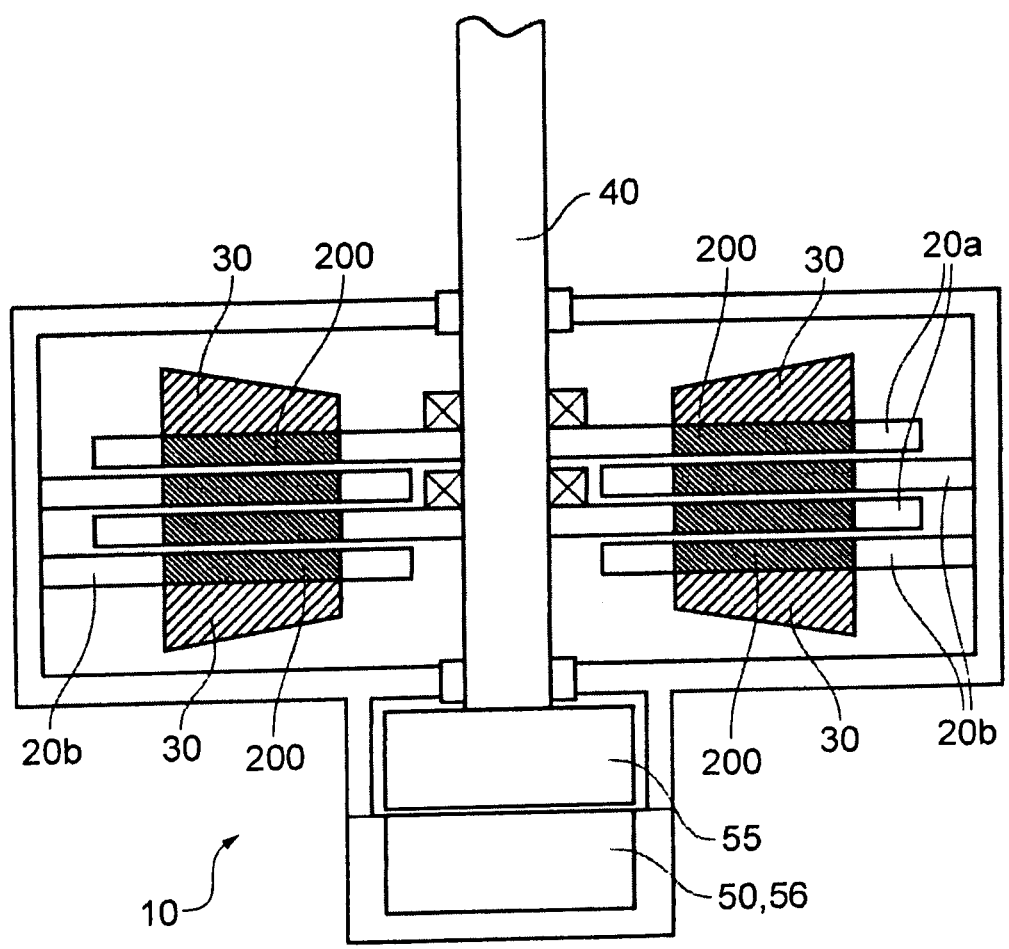
FIG. 7 is a diagram of an axial flux motor assembly embodying the present invention.

As shown in FIG. 7 an axial flux motor assembly 10 embodying the present invention comprises a stack of first and second discs 20a, 20b arranged alternately such that there is a gap allowing rotation between each disc 20a, 20b. For simplicity in the embodiment shown, there are only two first discs 20a and only two second discs 20b in the stack, but in a practical motor there may be a set of several first discs 20a and a set of several second discs 20b. The first discs 20a are mounted on a rotatable shaft 40, whilst the second discs 20b are fixed in position. The first and second discs 20a, 20b each comprise sectors 200 of magnetic material arranged within the disc 20a, 20b, between each of which sectors 200 is a radially-extending section 202 (hereafter termed a "conductor" or "spoke") of a conductive path 201 for conducting electric current. The polarity of the current flowing in adjacent conductors 202 when the assembly is in use is mutually opposite. The sectors 200 of magnetic material on the first and second discs 20a, 20b are arranged at a constant angular pitch, but the pitch of the sectors of magnetic material on the first disc may or may not be the same as those on the second disc. When electric current flows in the conductors 202, magnetic flux runs perpendicular to the faces of the discs 20a, 20b in axially-extending flux paths, such that, considering the first disc(s) independently of the second disc(s), the magnetic flux in one axially-extending flux path runs in an opposite direction to that in the immediately-adjacent flux paths on each side of it, and is returned by flux return portions 30 of magnetic material provided at each end of the assembly 10. The total flux is the super-position of the flux of the first disc(s) and the second disc(s). The assembly 10 further comprises means 56 for sensing relative angular position between the first and second discs 20a, 20b and switching circuitry 50 for reversing the direction of current flowing in the conductive path 201 in one of the first disc 20a or the second disc 20b in correspondence to rotation thereof relative to the other of the first disc or the second disc in such a way as to effect continuous rotation of the first disc. Angular position sensing may be achieved by conventional means, such as optical sensing or Hall Effect magnetic sensing (not shown). Means 55 are provided for supplying DC to the first discs 20a.

Figure 8:
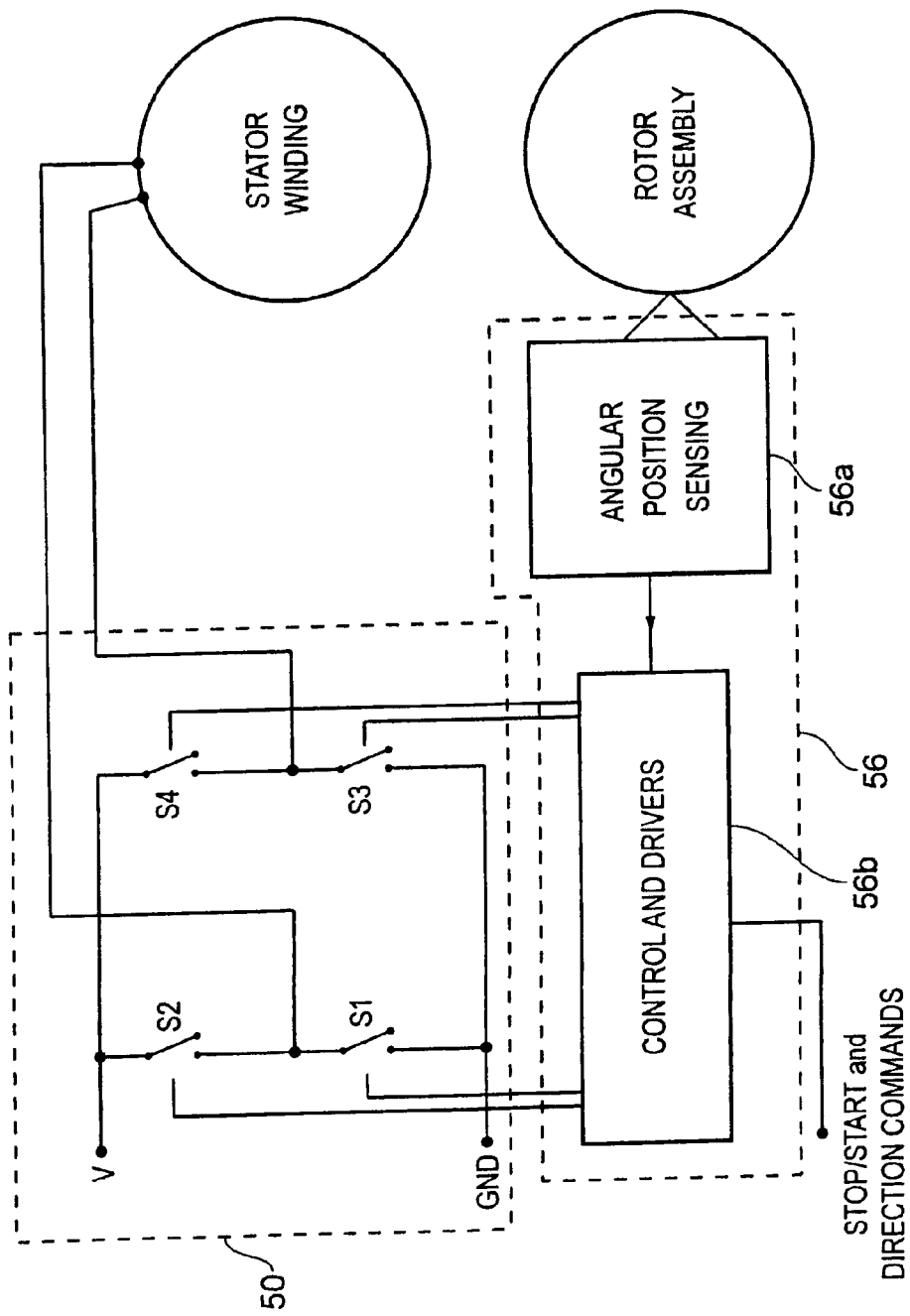
FIG. 8 is a circuit diagram.

By way of example, FIG. 8 shows how current reversal in the second disc(s) ("stator windings") may be achieved. Switching circuitry 50 comprises a conventional bridge drive circuit comprising semiconductor switches S1 to S4 operable to drive the stator windings with electrical current of either polarity by closing either S1 and S4 together, or S2 and S3 together. The output of conventional angular position sensing means 56a are fed to control and drive electronics 56b which also accept external commands in respect of stop-start and direction signals and produces drive signals to S1 to S4 accordingly.

Figure 9:
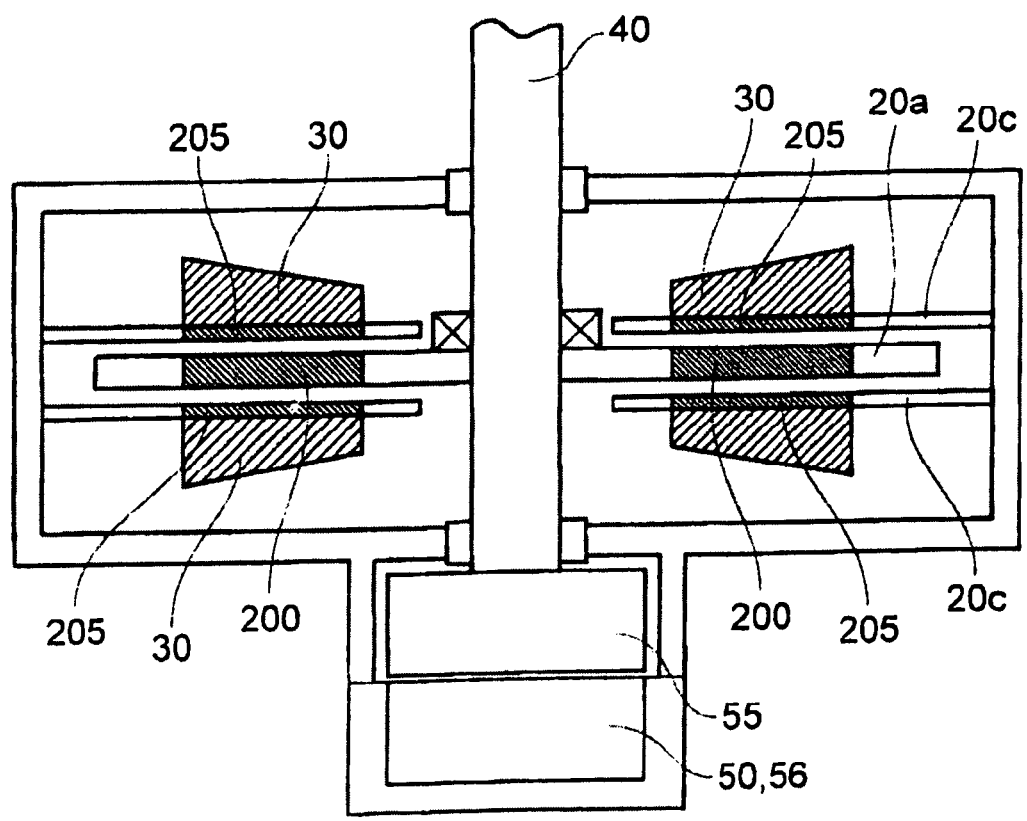
FIG. 9 is a diagram of another axial flux motor assembly embodying the present invention.

As both the first and second discs see a variable flux in the movement of one sector across the other, the flux return portions 30 (called flux return rings hereafter) need to be of low loss steel (so that magnetic cycling does not engender heating). They are preferably constructed with conventional motor steels in laminated form such as to suppress eddy currents, such as the spiral arrangement disclosed in FR2639486, or of composite iron powder or iron wire materials capable of supporting magnetic flux and suppressing eddy current generation. In the embodiment illustrated the flux return rings 30 are mounted on each of the first and second discs 20a, 20b, but there may be lower losses if the flux return rings 30 rotate (or stay still) with the field that is not switched. In an alternative embodiment illustrated in FIG. 9, there may be one disc 20a, and the function of disc 20b may be split into two discs 20c provided at respective ends of the stack, which discs 20c are of half the thickness of each of the first and second discs 20a, 20b and carry sectors 205 of magnetic material of half the thickness of those on the first and second discs 20a, 20b. The arrangement may also be reversed in that the fixed disc 20b may be of full thickness and placed centrally between two half thickness discs 20d mounted to the rotating shaft. The arrangement may be used with multiple discs, in the general form that if there are N full thickness discs of one kind 20a or 20b then there are N-1 full thickness discs and two half thickness discs of the other kind 20c or 20d at each end of the stack.

Figure 5:
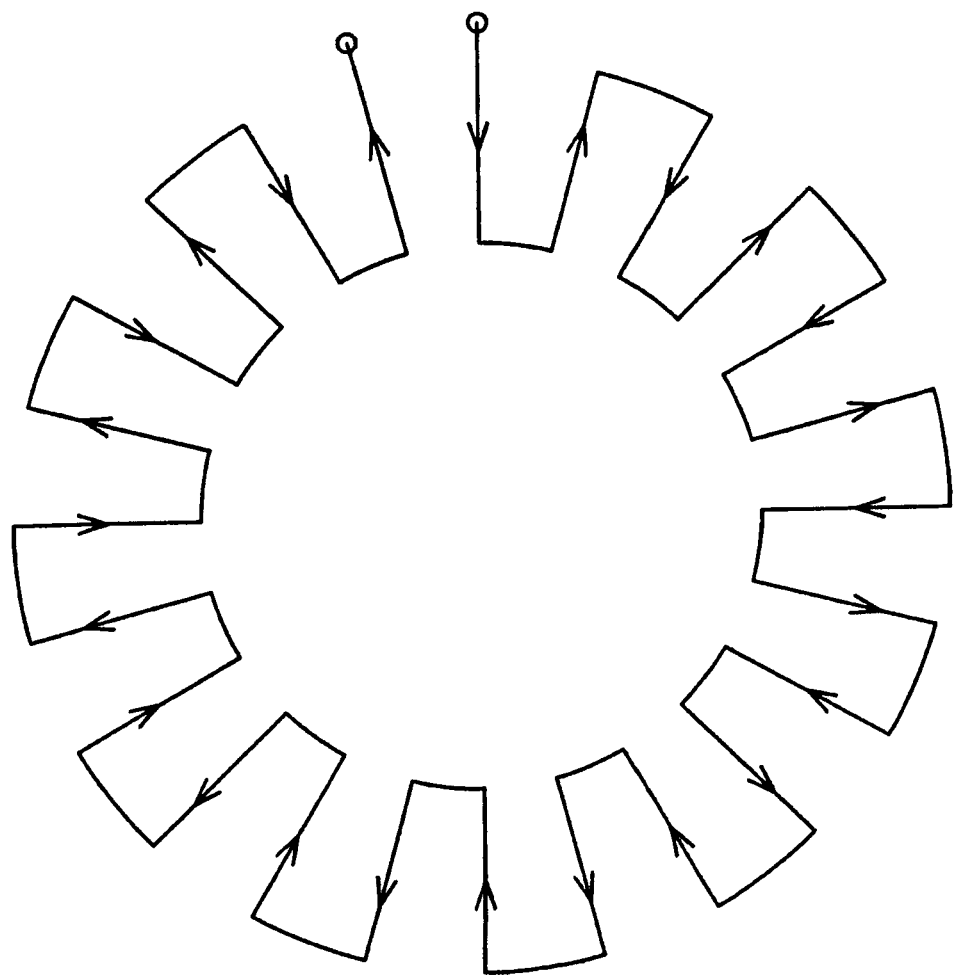
FIG. 5 (described above) is a diagram showing a conductive path in a prior art axial flux motor assembly.
Figure 6:
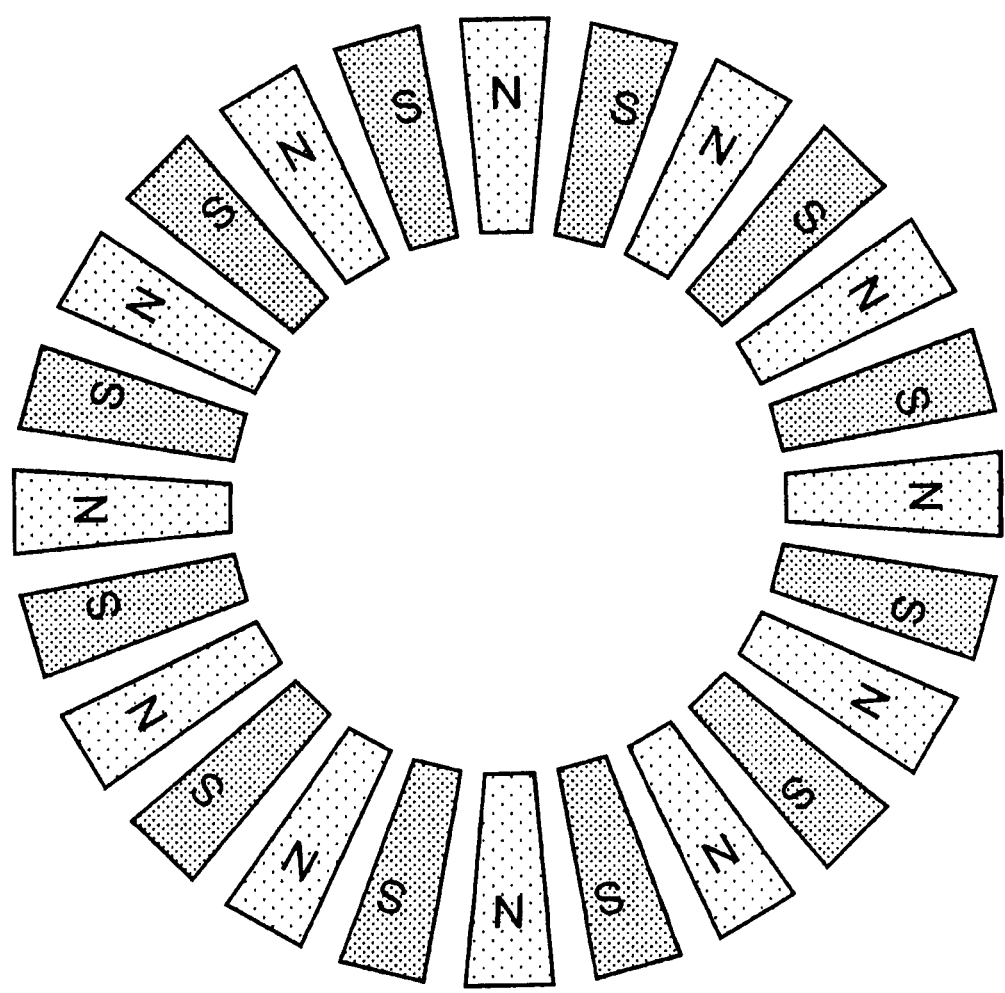
FIG. 6 (described above) is a diagram showing a magnetic flux pattern with which current in the conductive path of FIG. 5 can interact.
Figure 11:
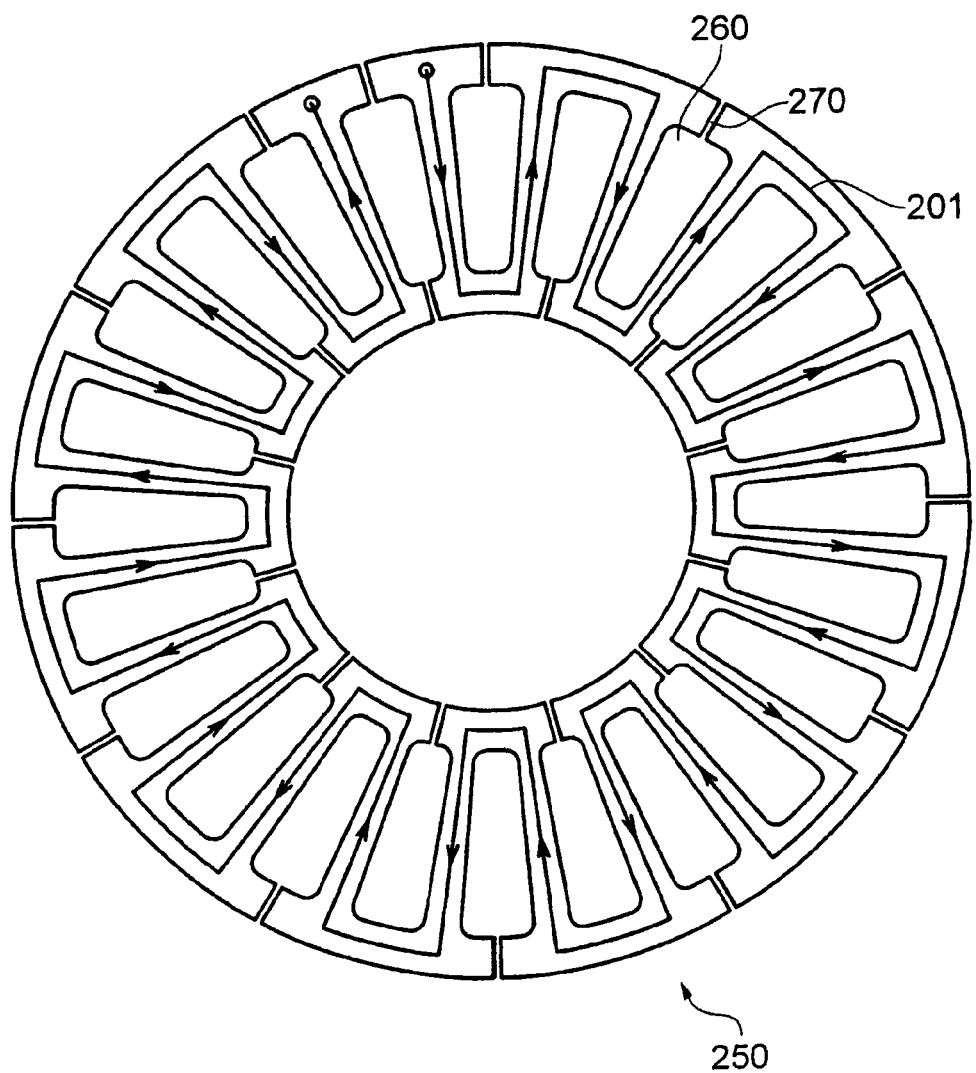
FIG. 11 shows the disc of FIG. 10 with the conductive path of FIG. 5 overlaid.

In the simplest embodiment, the first and second discs 20a, 20b are substantially identical. The discs 20a, 20b may take the form of the disc shown in FIG. 10, in which the main structure of the disc 250 is aluminium alloy. All alloys of aluminium conduct electricity well, and have a low density and can have considerable mechanical strength. Considering only the aluminium part, it can be seen that cut-outs 260 and slotted gaps 270 form a conductive path 201 which has the form of FIG. 5. FIG. 11 shows the assembly of FIG. 10 with the conductive path 201 of FIG. 5 overlaid. Although cutting out the conducting shape from the aluminium alloy disc will reduce its mechanical strength and stiffness considerably, this can be restored by adding composite material and using of non-conducting high strength resins. In particular the outer circumference of the discs can be considerably strengthened by machining a slot and winding a high strength fibre into it, bonded by resin.

Such a disc is particularly suitable for slow speed, high torque motors. However, for other applications it may be more appropriate to provide discs 20a, 20b having wiring for the conductive path(s) 201 as in FIGS. 12A and 12B, which show conventional windings 230, which may be of partial or multiple turns around each sector 200 to suit voltage and current requirements, bonded to the magnetic sectors 200 by resin materials, such as epoxy resin. The magnetic sectors 200 may be formed of a soft magnetic material capable of sustaining high flux density, such as laminated motor steel or resin bonded iron filings. Between the magnetic sectors 200 and the windings 230 are layers 236 of material provided for added structural strength and protection. Over each disc face strengthening layers 235a, 235b, of material such as glass fibre or Kevlar, are provided, covering every part of the disc other than the magnetic sectors 200.

Figure 13D:
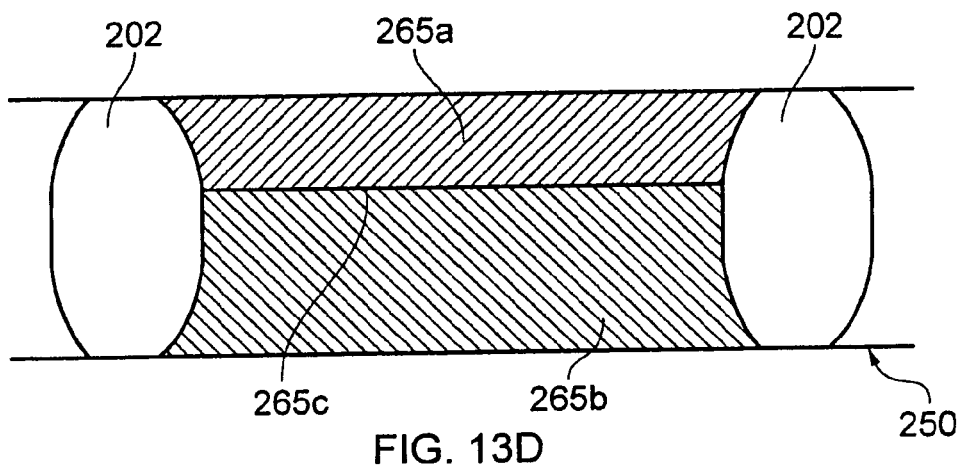
Figure 13E:
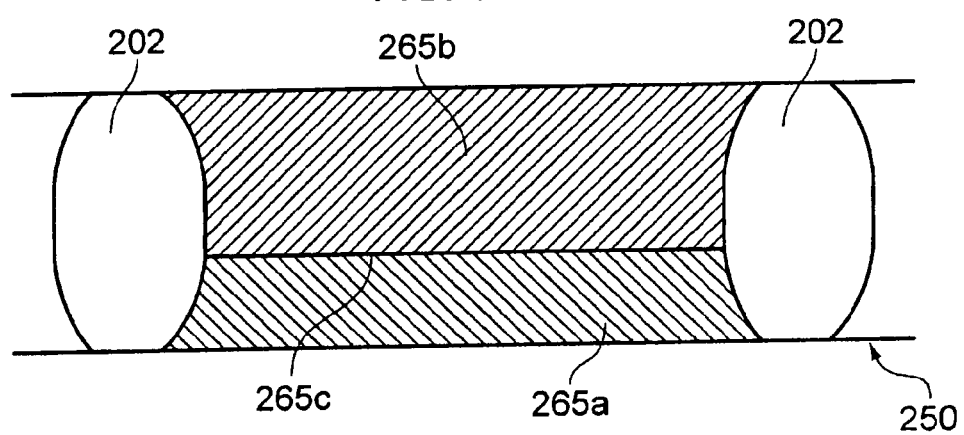

In this embodiment the magnetic sectors 200 of the present invention comprise magnetic material 265 filling the cut-outs 260 in the aluminium alloy disc 250. The magnetic material 265 is a soft magnetic material capable of sustaining high flux density, such as laminated motor steel or resin bonded iron filings, and it is convenient that the laminations are as shown in the detail of FIG. 13A. As shown in plan view in FIG. 13B and in section around the conductor 202 in FIG. 13C, but not in FIG. 13A, an electrically-insulating barrier 266 is provided around the edges of the magnetic material 265, so that the electric current is constrained to the intended path and does not short into and across the magnetic material 265. This barrier 266 is conveniently combined with the means of fixing, using a glass tape around the boundary, which is impregnated with a resin, such as epoxy.

Where the magnetic material is in the form of laminated motor steel then it is advantageous to construct this in the way shown in FIGS. 13D and 13E. The conductors 202, which can conveniently be regarded as radial conducting spokes, have a section with two curved end portions and a substantially straight middle portion. This allows the laminations to be cut into short and long segments 265a, 265b with 'butt' joins 265c where the flat and curved sections of the conductor 202 join. It is important that any gap at the 'butt' joint 265c is small compared to the gap between discs 20a, 20b, so that the magnetic reluctance of the path is little changed. Alternate layers of lamination are then placed into the discs such that the position of the joins alternate (in an exactly analogous way to a 'bond' in brickwork) and if the construction is made with a resin glue this will form the laminations into a composite structure which is mechanically locked into the disc by the sectional shape of the "spoke".

Figure 13F:
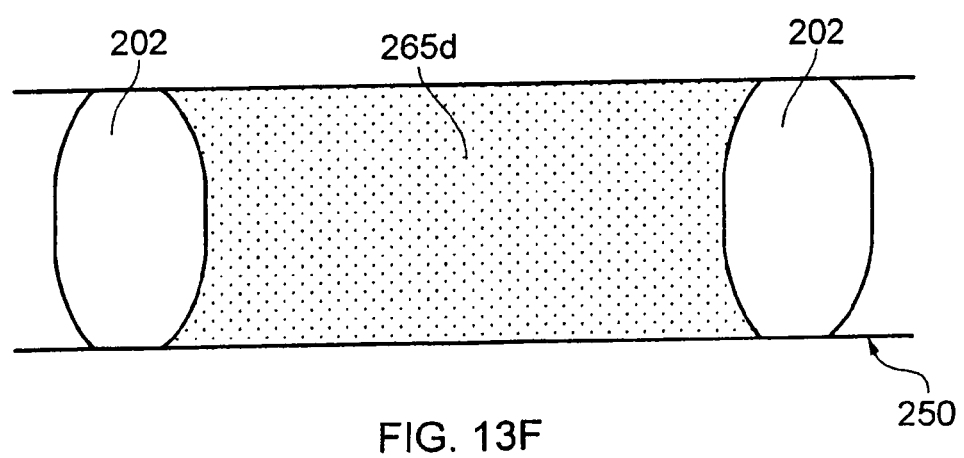
Figure 13G:
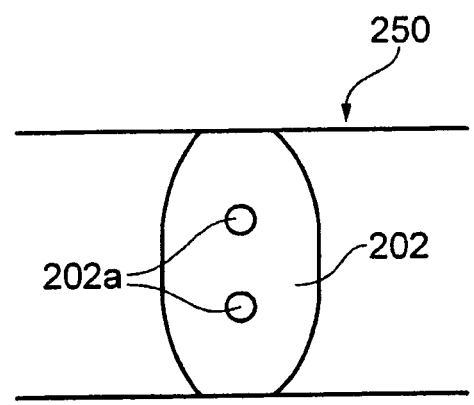
Figure 13H:
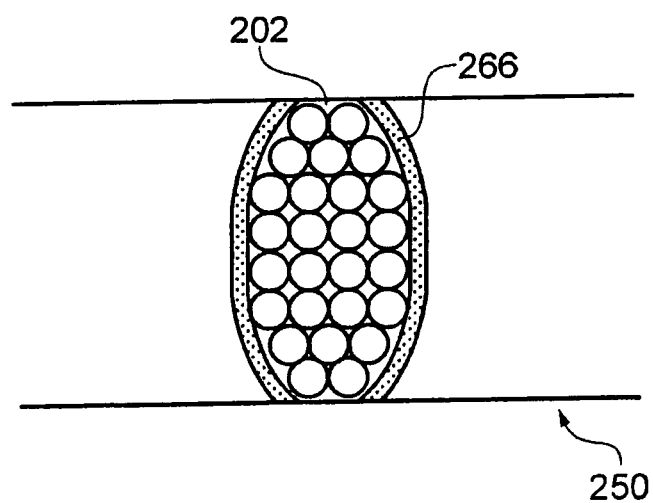

Alternately the magnetic portions of the discs may be formed using a composite 265d of iron filings and resin, filling the space completely as shown in FIG. 13F: where the composite is not electrically conductive the electrical insulating barrier shown in FIGS. 13B and 13C may be omitted.

FIG. 13G shows two cooling channels 202a in the centre of the conductor 202 which can be used for liquid cooling of the conductors by conventional means.

FIG. 13H shows the conductors formed with a bundle of wires, representing a sectional detail corresponding to FIG. 12. The gaps between wires may also be advantageously used to provide liquid cooling channels in this form of construction.

There are several ways to understand the operation of this device mathematically, but the simplest is to consider a first set of discs as providing the 'field' and a second, interlaced set as providing the currents, and it is clear that there is force, and thus torque, generated in an analogous fashion to that in a permanent magnet motor. The exact calculation of force is complex and is best done by "finite element" means on a particular design. The calculation of the field generated by the two sets of currents is somewhat simpler, because for each set it reduces to a simple reluctance calculation as shown below. Invoking the principle of super-position of linear fields (and, subject to the magnetic fields not saturating the magnetic material, this is valid) the total magnetic (B) field is the sum of the two separately derived fields. FIG. 14 shows a radial view that has been straightened out (ie removing the effect of curvature, as would be the case in a linear motor based on this principle).

An alternative treatment is obtained by noticing that this is a set of like and unlike currents, free to move in sets, in a high permeability medium in which the air gap between discs is kept small and so the effective permeability remains high. Like currents attract and unlike repel, and thus from any starting position the currents will seek to line up with like currents together. If the direction of one set of currents is now reversed (and assuming some rotational inertia or more than one winding phase), then the device will continue to rotate for another sector.

Figure 1:
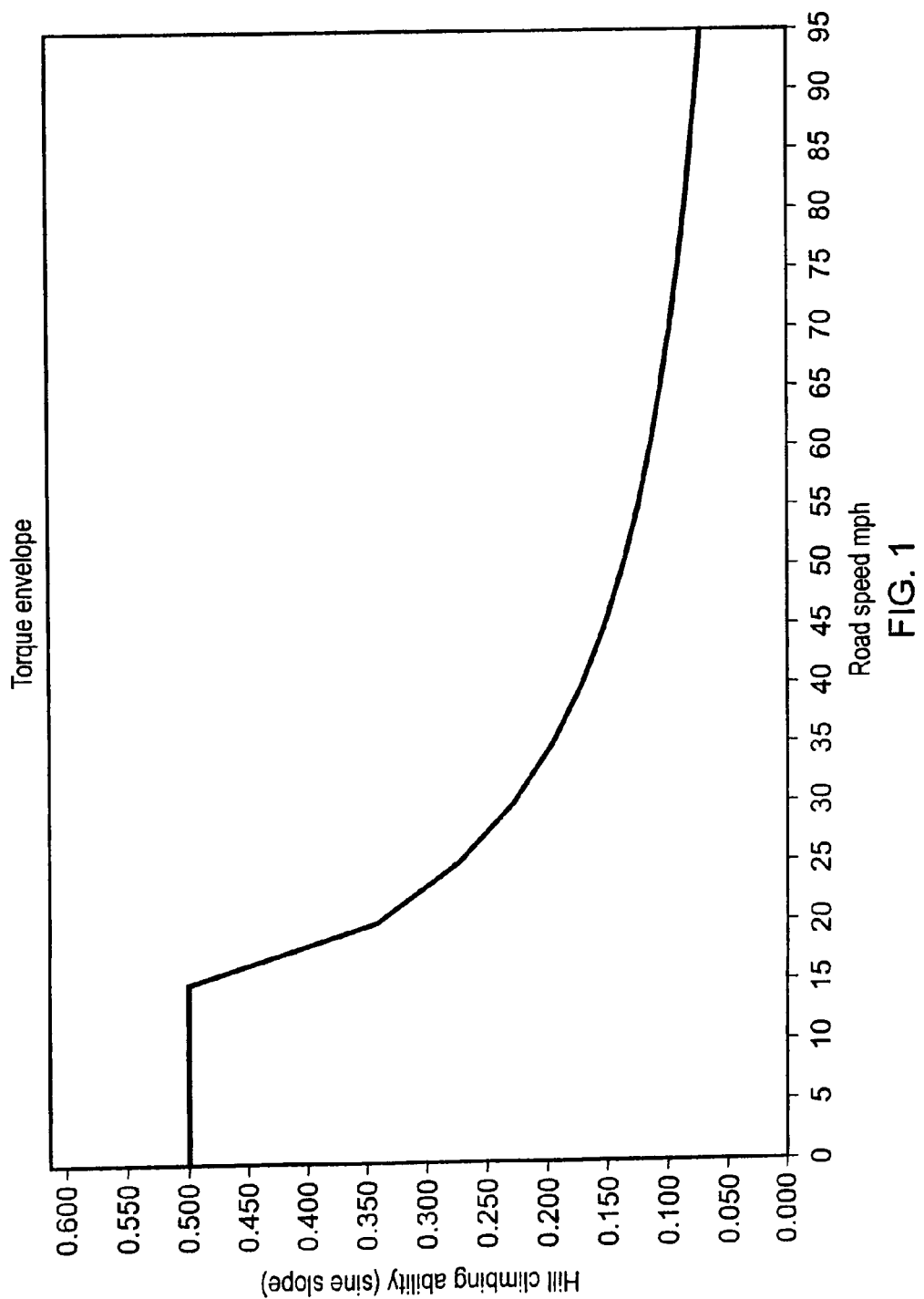
FIG. 1 (described above) is a graph of hill climbing ability against road speed.
Figure 2:
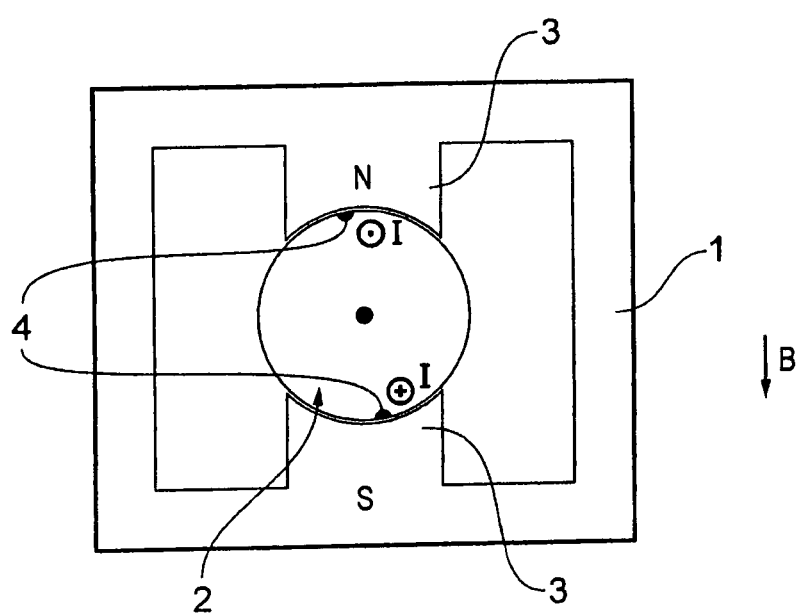
FIG. 2 (described above) is a diagram of a prior art two pole permanent magnet DC motor.
Figure 3B:
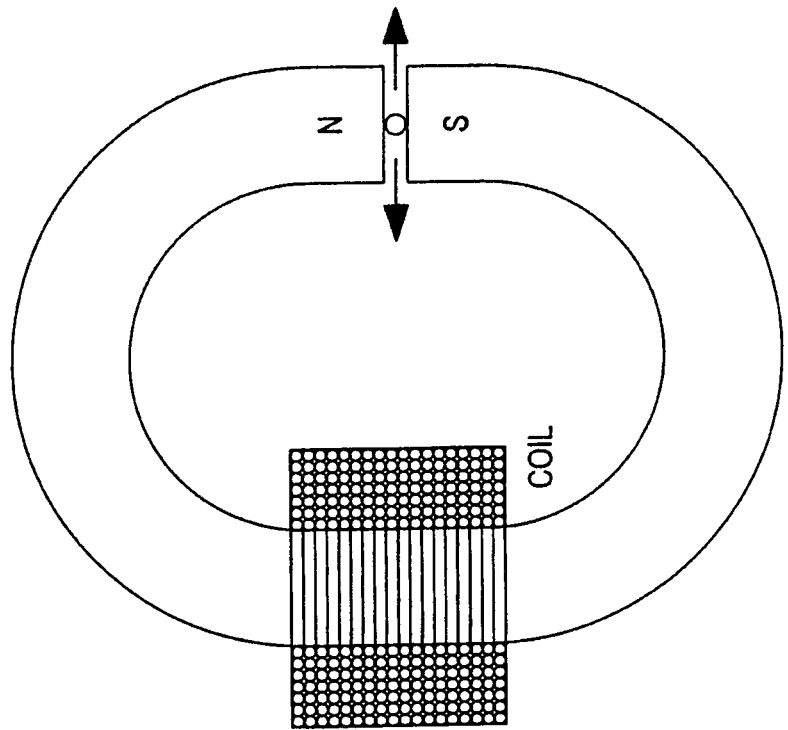
FIGS. 3A and 3B (described above) are diagrams showing the force on a conductor in a magnetic field.
Figure 3A:
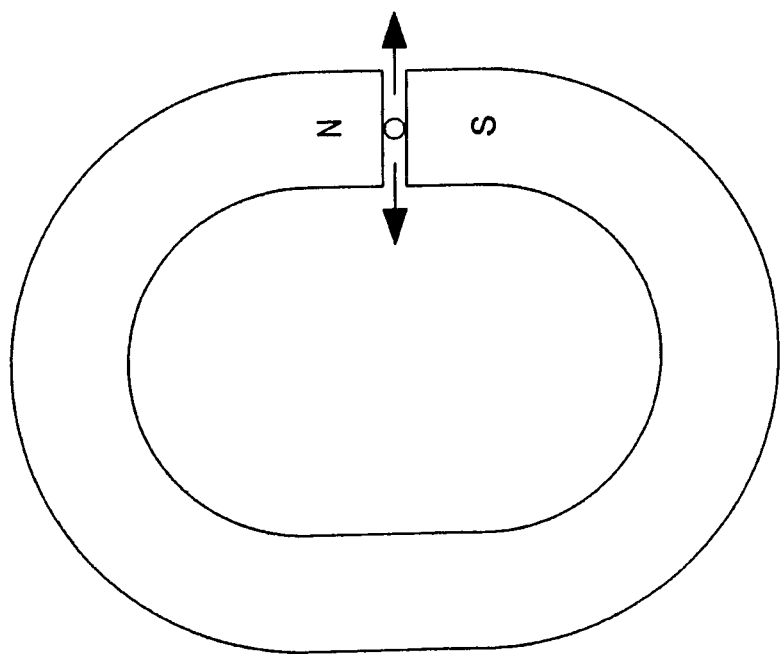
Figure 4:
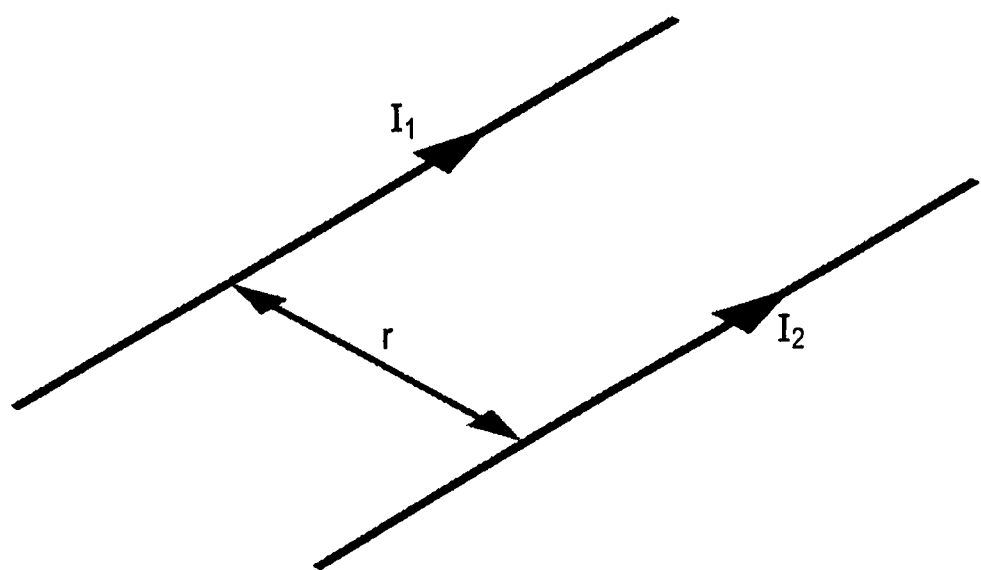
FIG. 4 (described above) is a diagram showing the force between two conductors.

It is worth noting that whilst it is a true statement that a small gap in the magnetic medium means that the effective permeability remains high, it is the case that this gap is constant in the axial direction, and is the design parameter that is used to control the strength of magnetic field that occurs for given currents (see below). As such the gaps represent the predominant magnetic reluctance in any magnetic flux path. This has the effect of spreading the flux out evenly across the gap (considered in respect of the field from each set of currents separately). The consequence of this is that the force generated by interaction with a current now becomes essentially linear across most of the face of the magnetic sectors, and the 1/r dependency (where r is separation as per FIG. 4) that is expected for the interaction between two parallel currents is linearised. Each conductive path 201 can be allowed to generate a flux density only half that of saturation, since it is necessary that where fields from the two sets of discs reinforce they do not saturate the magnetic material.

Current must be delivered to the rotating disc(s), but since the reversal of current necessary for continuous rotation only needs to happen on either the first discs 20a or the second discs 20b, but not both, this switching can happen on the stationary, second disc(s) 20b, in which case it is only necessary to supply DC to the rotating first disc(s) 20a.

The gaps between the rotating discs have to be set such that the required field will be generated across them by the currents in the conductors, and to obtain maximum torque this field should be at half saturation flux density at maximum operating current. However, the ability of a conducting "spoke" to conduct electricity (particularly if there is liquid cooling) is something that scales with the cross section of a spoke, which scales as the square of the linear dimensions.

It can be seen that, ignoring end effects (in the general case that the magnetic sectors 200 are radially long compared to their width) and considering one set of discs alone, the Amp Turns generated around each sector 200 of magnetic material has to drive this critical flux level across two air gaps (because the first and second discs 20a, 20b are interleaved). The reluctance of the magnetic material can be ignored (because the relative permeability of the magnetic material is very high), so the two governing relationships are $$H \cdot 2 \cdot gap = \text{Amp Turns}$$

$$B_{s/2} = \mu_0 \cdot H$$

so Amp Turns = $2 \cdot gap \cdot B_{s/2}/\mu_0$ where
$B_{s/2}$ is the half saturation flux
$\mu_0$ is the permeability of free space
H is the H field A very simple relationship then emerges, which is that the Amp Turns necessary can be expressed simply per millimeter of gap for a given flux, thus $$\text{Amp Turns} = 0.001/\mu_0$$
$$= \text{approx } 800 \text{ A/mm} \bullet \text{Tesla}$$

If the thickness of a disc is d, the gap is g and the current density is J, and simplifying to the case that the conductor cross-section is square, the cross sectional area is $d^2$ and the current is $J \cdot d^2$. If, by way of example, the saturation flux density of the material was 2 Tesla, then the flux generated by one set of discs should not exceed 1 Tesla, so $g = J \cdot d^2/800$ working in mm per Tesla of half flux density This relationship can be simply scaled to other working flux densities. It can be seen immediately that the assumption of a square conductor cross section means that the gap scales as the square of the linear dimensions. Since the tolerances on machining a narrow gap can be assumed to scale linearly with the dimensions of the device, it can be seen that it is relatively easier to build bigger machines. Alternatively, it can be said that a given gap requires a given cross section of conductor 202, so that in bigger machines the angular width of a segment can be reduced.

The table below shows the gap for a current density of 5 Amps per square mm and a material saturation flux density of 2 Tesla.

| Gap relationship to dimensions Current density 5 | |
|---|---|
| Disc thickness D mm | Gap G mm |
| 1 | 0.006 |
| 2 | 0.025 |
| 3 | 0.056 |
| 4 | 0.100 |
| 5 | 0.156 |
| 6 | 0.225 |
| 7 | 0.306 |
| 8 | 0.400 |
| 9 | 0.506 |
| 10 | 0.625 |

Note that this is the total spacing, ie two gaps. Whilst very small machines are not impossible, it can be seen that a disc thickness of 3 mm is about the limiting value for precision machining. A disc thickness of 6 mm gives two gaps each of 0.1 mm, which require relatively easy machining. Use of liquid cooling would allow higher flux densities, and thus smaller machines, or larger gaps.

It has been shown that if a single winding is used in each of the first disc 20a and the second disc 20b then a torque will be generated up to the point where the first discs 20a move until all like currents are closest to each other. In this condition, if each current is at the value to generate half saturation flux, then the combined effects of the two sets of currents will be to establish saturation flux density up one axial flux path and down the next.

If one set of currents is now reversed it can be seen that all currents will now be 'unlike', generating repulsive forces, and if they are perfectly rotationally aligned, these forces will all be exactly axial and there will be no rotational component. Also in this position the magnetic effects of the currents will exactly negate each other and the flux density will be zero in each axial flux path. It was noted above that the effect of the controlled gap was to spread the flux out evenly across the gap. Thus it can be understood that, starting from the position of alignment of like currents, followed by reversal of one set, then, as the first discs 20a traverse across the second discs 20b, the general case is that each axial flux path (neglecting the curvature resulting from the interleaving of first and second discs) will be separated into a zone between like currents where the flux is essentially zero, and a zone between unlike currents in which the flux is essentially saturated (assuming limiting currents). It is then possible to make an interpretation that the forces generated are such that the flux lines in high flux density spread out and for all areas of zero flux to reduce in area. In this motor application the action of the reluctance of the air gap and the currents in the conductive paths is to generate new, essentially constant density flux in the areas where there is flux. This generation of constant flux density with rotation corresponds to the linearization of the forces described above.

This interpretation is useful in understanding the optimal cross-sectional shape for the conductors, and the building of real machines capable of delivering continuous torque. Non-ferrous conducting material exhibits a very low magnetic permeability, and this can be treated as being that of free space, or equivalently of the air gaps. FIGS. 13C to 13H show a conductor 202 with a cross section which is curved in the axial direction towards each disc face, with a finite width at the point where it comes to the edge of the disc and the air gap, and which may have a straight section 202b in the middle of the disc thickness to aid construction with lamina of motor steel. FIG. 15A shows that the angular relationship between the first and second discs 20a, 20b can be considered as the general case, ie no particular relationship, with conductors 202 of the cross section of FIG. 13C. FIG. 15B shows the same first and second disc set in a position in which they are just beginning to separate (or equivalently are getting close together).

Consider first the dimensions shown as e (edge) and c (centre) on FIG. 15A, which are respectively the lengths of the cross section of the magnetic sector 200 where it is widest and where it is narrowest. It is clear that if the flux density is saturated in the centre then the flux density at the edge is lower by the factor c/e.

Now consider the flux generated by only one set of discs, for instance by the first discs 20a alone. If this were a continuous high permeability material, then it is clear that the flux lines would have the general form shown in FIG. 15C where the pattern would be up and down alternate axial flux paths, but close to each conductor 202 some flux would simply encircle the conductor. This would have the effect that flux close to each conductor 202 on the centre line of each disc would now not go up and down the axial flux path, and would reduce the flux that traverses through the interleaving discs 20b to below the geometric factor c/e.

However in this motor design it has been noted that the current in each conductor 202 has to excite flux in two air-gaps (this is simply the number of air-gaps divided by the number of currents for flux up an axial path). If the width of the flat part of the conductor 202 is w, the airgap is g, and w>g, then the magnetic reluctance around a single conductor 202 is proportional to $$2 \cdot w + 4 \cdot (A \cdot g), \text{ where } A \text{ is a constant} < 1$$

if the path is through the airgap. Since w>g then the majority of the flux will take the route via the magnetic material in adjacent layers and the reluctance is proportional to 4·g. By comparison the reluctance to flux going up and down an axial flux path is simply proportional to 2·g and thus this is the lowest reluctance path.

It has been noted above that the reluctance of an air gap is very much higher than that of any continuous path through the magnetic material, and as is well known this has the effect of evening out the flux density across the air-gap, and requiring the flux to cross any gap almost at right angles (except at edges where there will be fringing). This has a curious effect in these circumstances, which can however be rigorously justified by invoking Ampere's theorem.

Consider points on the line 151 in FIG. 15C. Any flux taking a route around a single conductor 202' will now be driven by the currents in both conductors 202' and 202" and, since the Ampere integral around each current is now dominated by the reluctance of four air gaps, the H field in the magnetic material is small and very nearly equal and opposite. The effect of the dominance of the airgaps is to diminish the dependence of the H field along the line 151 on the distance from conductors 202' and 202". So the lateral H field is almost zero anywhere along this line given the condition w>g, and exactly zero at the centre-line of the disc.

Geometrically, if w was equal to g, then since the flux density through the middle of the thickness (ie where it is narrowest, dimension c) is going to be substantially constant, the 'lost flux' going the route around an individual conductor 202, as viewed on the centre line, is going to have an extent less than half of the thickness of a disc, since this is the maximum lateral path width for flux encircling a conductor 202. This factor will be less than half because even in an entirely continuous medium the flux density falls off towards the centre of the disc thickness in such lateral paths. With w>g the lateral flux is reduced both by the factor g/w and by the cancelling effect explained by invoking Ampere's theorem.

The general condition for building motors in which the flux runs substantially in axial flux paths is given by w>g and e>d, where d is the thickness of a disc.

Turning now to the other aspect of the conductor shape, it was shown above that when the relative angular position is such that the conductors of the first and second disc sets are aligned, and noting that conducting materials generally have a low permeability, equivalent to that of the air gap, then when the currents are reversed in order to effect further rotation, it is necessary for new flux to be generated between the unlike currents for torque to be generated. However when they are in an overlapping position all the flux paths have a high reluctance, and generation of new flux in the axial flux paths is largely prevented. Thus whilst it is advantageous for w to be greater than g in order to minimise flux simply encircling conductors 202, greater values of w will have the effect of increasing the angle of effective overlap of conductors in which no torque can be generated (which can be called a 'dead-band'). The width w of the conductor 202 at the face of each disc 20a, 20b is thus constrained.

Thus, the optimal shape for a conductor 202 can be imagined as somewhat equivalent to a bridge pier in a river: it needs maximised cross section to carry current, but if it is also relatively narrow at the edges on the disc face (such that it is also compatible with the need for w>g) then torque will be nearly constant and continuous until the direct flux path across the gap is closed off by the overlap of the conductors.

It has been shown above that, starting from a random position, all the like currents will try to line up and the motor will rotate until this happens. It has also been shown that if one set of currents is then reversed, then the motor will again rotate by a sector angle until the currents again line up. It has further been shown that when the discs are perfectly aligned no torque can be generated, and there will be a 'dead-band' around alignment where torque will be insignificant (the width of this 'dead-band' being determined by the width w of the conductor at the face of the disc).

Clearly it is possible to build motors with the simplified construction described if it is acceptable to use the mechanical inertia of a flywheel to carry the motor past the current reversal point, and the rotation will be continuous.

However in many motor applications, and in road traction in particular, it is necessary to have torque that is continuous and allows starting from any angle.

There are three ways to achieve this:

a) Two sets of first and second discs 20a, 20b and flux return rings 30 can be mounted on a single shaft, with a phase separation of half a sector between each set. In the general case both will be able to provide torque, and when one is passing through the alignment position, the other will have currents in the centre of the fields and be able to produce maximum torque, so starting is assured. If the conductors 202 are shaped, with the 'bridge pier' effect, so as to have a minimum angle of alignment when there is no torque, then for a high proportion of the time both sets will be able to produce full torque. The worst case with this solution is when starting or rotating very slowly when one set of windings is going through alignment. It is not possible to operate this at any torque above half, because putting twice the current into one set will drive the magnetic material into saturation. A second disadvantage of this approach is that the two rotor/stator sets have to be magnetically independent, and so each needs a set of flux return rings, adding considerably to the overall mass.

The second approach is to have two windings, with a half sector positional difference between them, in either the first or second discs. There is no advantage in having two such winding sets in both the first and second discs, and for simplicity it is preferable that it is the second discs which have two such sets. It is advantageous that the two windings share the current when both can generate torque, with one winding carrying all the current close to alignment of the other. Thus, torque is continuous and the saturation problem does not exist. There is a cost of double dissipation when only one winding is acting on its own.

Another advantage of this option is that only one set of flux return rings is needed, and this is a considerable saving in mass.

It should be noted that it is possible to have more phases in this option in either or both discs, and there are a large number of permutations. However, as the number of phases in a disc goes up there is a trade off between restriction of the magnetic material area and the width of the conductors 202, and the angular pitch of the magnetic sectors 200.

The third option is the most complex but also possibly the most advantageous, and it might be likened in principle to the Vernier scale for measurement. Consider a set of rotors with 18 sectors of magnetic material, and a set of stators with 20 sectors of magnetic material, as shown in FIGS. 16A to 16F. This number of sectors is low by comparison to actual designs, but is representative, and the chosen number of sectors makes the pitches in degrees easy, ie 18 sectors at a pitch of 20 degrees, and 20 sectors at a pitch of 18 degrees.

FIGS. 16A through 16F show the radial currents in the first discs (rotors) in dashed lines and those in the second discs (stators) in dotted lines. As for all other versions of the motor it is assumed that all rotors line up with other rotors, and all stators line up with other stators, so that the flux in the magnetic parts from each set taken alone is in alternate pathways that are axial, and that the composite flux is a superposition of the two. It is also assumed that each radial current represents the centre of a conductor which has the essential properties described as like a pier of a bridge, ie an angular width on the face of a disc that is large by comparison to the air gap, and relatively small by comparison to the width of the sector, thus allowing most of the face of a sector to be occupied by magnetic material in which flux can be generated. The comments above about the need for a low reluctance path for new flux to be generated, and of a dead-band in which no torque is generated, should now be considered as applying to individual pairs of conductors which are close to alignment.

In FIG. 16A the rotor conductor is shown as fed from the centre, as might be the case in a rotor fed with any of the means described below (slip rings, inductive coupler).

The stator conductor path is shown as a continuous serpentine conductor path, with each outside arc path connected to terminals T0 through T9. For simplicity the presentation here assumes that the winding is a single conductor and also that access in a practical stator is only available to the outside portions, however this should not be considered restrictively. In FIG. 16A the drive voltage is shown as applied between terminals T0 (pos) and T5 (neg), and it should be noted that the radial currents in the two conductors either side of the terminal point in use are in the same direction, which means that the field in that sector from those two conductors will be zero.

The arrows on the conductors show the direction of current flow resulting from this connection, in conventional terms, ie positive to negative. The arrows around the periphery show the force on each conductor.

It can be seen that in FIG. 16A there is complete alignment of a rotor and stator current at the top and bottom of the figure (12 o'clock and 6 o'clock positions), and that these produce zero torque. Otherwise the arrows show that there is a consistent contribution from all conductors that applies a clockwise torque to the rotor, with a reaction torque on the stator of the opposite sense. Whilst the preferred method of analysis is superposition, the sense of contribution from each conductor can be verified by inspection by noting that like currents attract and unlike repel.

It can also be noted that because of the alignment there are no rotor currents between the two like sense stator currents at the feed points T0 and T5. If the "bridge piers" are narrow in an angular sense by comparison to the minimum separation of non-aligned stator and rotor currents, then all but two rotor current spokes will be in sectors of the stator generating field, and thus 16 out of 18 rotor currents will contribute torque.

In a similar fashion it can be seen that as the rotor winding is serpentine and conventionally fed, all the rotor magnetic segments generate field in their magnetic sectors. Also, given the same consideration concerning the angular width of spokes, all of the stator currents, excepting the two which are in complete alignment, will also generate torque.

Thus with the angular alignment shown, 16 of 18 rotor currents contribute, and 18 of 20 stator currents contribute, and so torque (assuming equal rotor and stator currents) is $34/38^{th}$ of what could be achieved with that many conductors in the simpler versions of the motor at alignment that would produce full torque.

FIG. 16B shows the same system, with the rotor rotated 1 degree in the sense of motion that the torque would generate (ie as a motor), clockwise. Since, as noted, the sector widths are 18 and 20 degrees, this naturally represents a rotation of half of a sector difference angle. The arrows showing the direction of torque now show that all currents contribute, and this will be the case if the angular width of the conductors is small. It can be seen that no rotor currents are in the magnetic sector at the feed point of the stator, but that two stator currents are in a single magnetic sector in two places in the rotor. So the general condition is that torque is $38/38$ths (ie 100%) with narrow conductors. However if the conductors are wider then there are four places where no torque will be produced, ie the torque is $30/38^{th}$.

FIG. 16C shows a further rotation of one degree, and since this is now a full pitch difference there is now alignment of two conductors half a pitch anti-clockwise from the feed point. The alignment is now of like currents, but otherwise the torque generation is as per FIG. 16A.

FIG. 16D shows a further 1 degree rotation, and the situation is a little different. If the angular width of the spokes is considered to be narrow, then the torques generated by the spokes half a pitch anti-clockwise of the stator feed points now oppose all the other torques: this however is using the interpretation of currents. It can however be seen that one of the rotor currents is now in a sector in which the stator currents oppose. If, however, the conductor conductors are wide, there will be no contribution from the eight currents which are close to each other, and the situation becomes that of FIG. 16B. Note that if it were possible to access the inner arc sections of the stator winding, it would be possible to add more switching and avoid this state, so the existence of these opposing forces is due to the limitation of the access to outside connection points.

FIG. 16E shows the same angular alignment as FIG. 16D (ie no rotation has taken place), but the connection point has now been moved round by two sectors (because only outside connection points can be accessed).

The effect of moving the connection point is clearly very much akin to commutation in a conventional motor, however it should be noted that commutation to a connection point 36 degrees away has happened after 4 degrees of rotation of the physical rotor. Whilst the commutation proposed here is not physical, the apparent rotation of switching is happening at a multiple of the physical rotational speed.

Examination also shows that the direction of current in four conductors (two at the top and two at the bottom) of the drawings between the new and the old connection points have changed, and thus the direction of torques in the interactions of the conductor currents between old and new connection points also reverse, but the net torque contribution from these conductors is still the same, ie with two pairs producing an opposing torque. Again, given that the conductors are sufficiently wide that no torque is generated from the four closely aligned conductor sets, this effect does not matter.

There is however another important point. Consider the four stator conductors (two top, two bottom) between the old and new stator current feed points. The closely aligned rotor currents have opposite sign, indicating that the motor back e.m.f. generated in the two stator conductors (which are in series) will be equal and opposite: thus, as the alignment of FIG. 16D is reached, the 'motor' voltage between T0 and T9, and T5 and T4 will fall to zero, irrespective of how wide or narrow the conductors are. If the conductors are wider, this will be a further effect ensuring that the voltage between old and new terminal points is zero (because of the effect of magnetic masking from the width of the conductors). Thus the alignment of FIG. 16D is optimal for switching, and 'make before break' switching can be used to suppress transients.

Finally FIG. 16F shows a further 1 degree rotation of the rotor with the new connection point. There are now two points of exact alignment of currents with opposite senses, and the situation is exactly that of FIG. 16A.

To generalise this, if there are S sectors in a stator, then S needs to be even because only outside terminal points are accessible, and the number R of sectors in the rotor needs also to be even: in this case the analysis is for R<S, but R>S will work.

The situation illustrated is for R=S−2

In such a case there will be two diametrically opposed points of alignment. If R=S−4 there will be four points of alignment and thus four terminal points are needed, 6 for R=S−6 etc.

In all cases the pitch angles in degrees are 360/R and 360/S.

The angle of rotation of the rotor between switching is twice the difference of pitch angles, ie

720*(1/R−1/S)

The contribution of conductor currents to generating torque has been described in relation to very narrow spokes. However, if the starting assumption is that the conductors are narrow in an angular sense by comparison to the sector angle, then it can be understood that doubling the angular width of a conductor can double the current, and double the torque. This will generally have the effect of blanking a higher number of conductors, but will still lead to an increase in total torque.

It can be seen that the 'Vernier' principle creates a continuous torque with a small amount of torque ripple, and a high percentage of the peak torque that would be available from mutually-coupled motors with equal numbers of sectors which would produce non-continuous torque.

Taking the above-described example of a 20 sector stator and an 18 sector rotor, switching occurs every 4 degrees, ie at 90 times rotation speed. Motors for direct road wheel drive have rotational speeds of up to about 1200 RPM, 20 RPS, so the commutation speed would be about 1.8 kHz. Practical motors might have twice as many sectors, and thus commutation switching speeds are fairly characterised as being a few kHz, which can be accomplished very easily in terms of semiconductor switching.

If the assembly described with reference to FIGS. 16A to 16F is to be used only as a motor then each switch can be a simple semi-conductor switch since the polarity remains constant. If they are to be implemented as motor generators then bi-directional semiconductor switches are needed. Reversing can be done either by changing the polarity of the rotor connection, or the order of connection of the terminal points (ie swapping the connections between T0 and T5, T9 and T4 etc).

FIG. 17A shows the switch positions for the arrangements of FIGS. 16A, 16B, 16C and 16D. FIG. 17B shows "make before break" switching, and FIG. 17C shows the switch positions for FIGS. 16E and 16F, with the intermediate position applying a bit before and a bit after the angular position of FIGS. 16D and 16E.

Multiple turn windings can be used and the effect around the feed point terminals (T0, T1 etc) is slightly different to that described for a single turn. In the practical case, that the conductors are wide and the two conductors on either side of a feed point are magnetically 'masked' by their width, there is no difference.

Examples of one, two, three and four windings are shown in FIGS. 18A to 18D respectively. It should be noted that a single serpentine winding is a special case, and that any multiple winding results in a reversal of current direction in respect of the polarity of the voltage applied; to retain compatibility with the description in FIG. 16 the polarity of feed is shown as negative in FIGS. 18B, 18C and 18D.

Clearly there are a large number of permutations given by the relative number of sectors, whether rotor sectors are greater or lesser than stator sectors, and whether multiple or single turns are used.

In summary it can be seen that the first option, of two rotor and stator sets on the same shaft, suffers from the excess mass of one extra pair of flux control rings. The second option is of medium complexity and will be efficient in terms of material used and performance, but suffers from thermal trade-offs around torque continuity. The third option is the most complex, but can be designed to provide truly continuous torque, and will utilise material as well as the second option.

It is now necessary to consider how the current gets into the un-switched set of windings (as explained above this is normally the rotor).

It is known in the art to use brushed slip-rings, but these are not favoured by comparison to fully electronic means, principally because brushes wear out and there is a service requirement. However it is entirely possible that this will still be used in a large number of machines, possibly more so in large static plant where the electronics would be very costly, and the service issue around brushes is not so problematic.

An alternative, probably more suitable, option is to use an inductive coupler. FIG. 19 shows such a device, consisting of a two part circular ferrite 'pot core' transformer T1. One half T1*a* is attached to the rotor 20*a* and the other half T1*b* to an end plate of the motor. The mechanical bearings, shaft, 'pot core' housing and mounting have to be sufficiently rigid and of sufficiently tight tolerance in terms of end-float that the two halves T1*a*, T1*b* are retained on a common centre line, and with a constant air gap.

The two halves are wound with transformer windings, which may be connected in a circuit similar to that of FIG. 20.

Here switches will be semiconductor devices, and where operation both as motor and generator is required, MOSFET devices are advantageous since they can be configured as bi-directional switches. When power is being put into the rotor from the motor frame, then switches S1 to S4 are operated in a conventional non-overlapping square-wave bridge drive (the signals are not allowed to overlap, i.e. to have two switches in a vertical pair closed at the same time, so as to avoid current flowing directly from the supply rail to ground). The voltage waveforms are shown in FIG. 21: lines 1 and 2 show the voltages at points A and B of FIG. 20 which put a square wave drive into the primary side of the main inductive element T1.

Action of the transformer T1 is entirely conventional, and thus a square-wave voltage appears on the output terminals at points C and D.

T2 is a very much smaller transformer used for synchronising the action of the inductive coupler. It is of similar form to T1, mounted, in non-conductive, non-magnetic material (for example, resin or plastic), so as to be rotatably connected between the frame and the rotor through the centre hole of T1. T2 is driven by a square-wave signal from a fixed standard voltage, for instance 12 Volts, and D1 to D4 form a bridge rectifier producing an internal power rail at points G and H. The signal across the input and output of T2 is shown in line 3 of FIG. 21. The following detector circuit also recovers the switching clock signal to synchronise operation of the inductive coupler.

On start-up, prior to establishment of a working voltage across point G and H, the body diodes of MOSFET switches S5 to S8 will act as a bridge rectifier and a voltage will be developed across points E and F of FIG. 20 and current will flow in the rotor windings.

As soon as there is voltage across points G and H the drive circuit on the rotor side can start to switch S5 to S8 so that they turn on very slightly after diode conduction has begun, and switch off just before the diode conduction will end. Suitable logic signals, derived from the timing recovery circuit, are shown in lines 4 and 5 of FIG. 21, respectively switching on switches S6 and S7, or S5 and S8. This turns S5 to S8 into a synchronous rectifier and power conversion, DC-DC, across the transformer becomes highly efficient. Line 6 of FIG. 21 shows the voltage that would be developed across points E and F in the case that C2 is absent. The voltage is seen dropping to zero as a result of the non-overlapping drive, and then it climbs to a lower level for a short time: this shows the voltage drop across the body diodes of S5 to S8. The voltage is then higher as the MOSFETs are turned on to form the synchronous rectifier and the MOSFET channel shorts out its own body diode. In a practical circuit C2 is included and serves to smooth out the transitions in voltage shown so that a substantially constant voltage is developed across points E and F and fed to the rotor.

The power circuit is then reversible when the motor is running as a generator. Power is developed in the rotor, switches S5 to S8 form the drive circuit, and switches S1 to S4 form the synchronous rectifier. Timing of the drives to switches S1 to S4 can be adapted in this mode so that they turn on after and turn off before switches S5 to S8.

As mentioned above, the motor may be used as a generator. Self-exciting dynamos have been known for a long time, and the principle here is essentially the same, although it is not necessary to make them self-excite if external power is available to provide excitation under electronic control.

The key to understanding of the generator mode operation is the realisation that the direction of rotation is set by the phasing of the drives to the winding. When the torque goes through zero the field collapses and therefore so does the voltage. However, there will be some residual magnetism and so long as the voltages on the windings are detected and the switching of the phase drives is correct, then a self-exciting mode will rapidly develop.

However, in the automotive application, rapid braking is desirable, and therefore a more deterministic means of initiating the generating mode is desirable. As has been noted, if the current in any winding passes through zero, then the field and the induced voltage also disappear. So the simplest way to start the generator mode is to drive a current through the un-switched rotor winding which is in a direction that will be the direction of the generator mode. All the windings can be modelled as a resistance in series with an e.m.f. When the device is acting as a motor the sense of the voltage generated by the current through the windings is additive to that of the motor emf, and so the drive voltage is higher than the motor back e.m.f and the resistance is a loss. When it is in the generator mode the resistance of the windings generates a voltage which is subtracted from the generator emf, and the terminal voltage is lower than the generator e.m.f., and again, as must be, the resistance appears as a loss. So the voltage applied to the rotor windings has to be negative, to start 'extracting' current from the motor, sufficient to start the mutual-coupling generation. Since the circuit complexity of introducing a negative voltage to start the rotor current adds complexity, it is practically easier to start the system by using a reverse connection on one of the switched windings.

If, once started, current is continuous in the rotors, then as the stator windings are switched the voltage rise in the stator circuits will be rapid. However, if the current falls to zero in either winding due to a sector switchover, then excitation will need to start again. It is therefore generally important to keep current flowing in both rotor and stators continuously. In the case of the second and third options outlined above, that naturally occurs with 'make before break' phase switching. With the first option it would be achieved by wiring the stator (switched) circuits of the two sets in series, so that a current is continually being induced in at least one of them.

Owing to thermal losses from the conductors, both the stators and rotors need to be cooled. Where the conductive path is formed by radial windings, as illustrated in FIG. 13H, it is convenient to use the interstices between individual conductors for cooling. Motors of this sort may have either gas (air) or liquid cooling. However, because the specific heat of liquids is higher than for gases, liquid cooling is the natural choice in higher power motors. Water is a common cooling fluid with a high specific heat and a low viscosity, but it is corrosive, conductive when contaminated and in use may be contaminated with particulate matter. There are a number of high-stability non-conductive liquids, such as transformer oils, which will be better in most cases. In the considerations below the term 'liquid' is used, and it should be considered that either option may be adopted, but that water cooling may have other requirements, such as ensuring adequate resistance to corrosion, and insulation on conducting parts. If liquid cooling is used, there needs to be an inlet and outlet on the shaft. This can be achieved by use of conventional rotary seals such as oil seals, and connection ways to a matrix of cooling channels which connect via the hub.

A preferred method of building the motor is as shown in FIG. 22. This shows a motor with a driven shaft 40. The torque is high and so the output shaft 40 has a minimum diameter. As has been shown, high torque to weight ratio motors tend to be short (axially) and fat (radially) and therefore it is convenient to put a double bearing 42 into a single "front" end plate 15a, such as to give complete location. The inner end of the shaft 40 can comprise a boss 45 onto which rotors 20a can be mounted. Rotors 20a and stators 20b can then be placed onto the motor in turn, with the dimensions of the rotor inner axial length determining the axial spacing of the rotors 20a, and the outer axial dimension determining the axial position of the stators 20b. The set of hub machine screws 21 can then be tightened to secure the rotors 20a. A "back" end plate 15b can then be put in position and tie rods or studs 22 in the outer skin of the motor can be tightened to secure the stators 20b in place. The motor is at that time mechanically complete. The shaft end and inner face of the "back" end plate 15b can contain the inductive coupler 55. Switching electronics 50 can then be secured in place and connected up; it is convenient to do this on the "back" end plate 15b, with an electronics housing cover 15c placed over the top.

Although in the above description the first discs are coupled to a shaft, and the seconds discs to the frame of a machine, it should be noted that hub motors, fans and underwater thrusters can commonly be made 'inside out', where it is the shaft that is static, and the rotating part (wheel fan, propeller) is built onto or coupled to, the outside of the rotating frame.

The invention claimed is:

1. An axial flux motor assembly comprising:
a stack of first and second discs arranged alternately such that there is a gap allowing rotation between each disc, there being at least one first disc and at least one second disc in the stack;
each said first disc being mounted so as to be rotatable; and each said second disc being fixed in position,
wherein each of the first and second discs comprises sectors of magnetic material arranged on a face of the disc, between each of which sectors is a radially-extending section of a conductive path for conducting electric current, the sectors of magnetic material on each first disc being arranged at a first constant pitch, and the sectors of magnetic material on each second disc being arranged at a second constant pitch, where the said first and second constant pitches are not equal,
wherein, when the assembly is in use:
the polarities of the currents flowing in adjacent sections of the conductive path in one of each first disc or each second disc are mutually opposite for all sections, and the polarities of the currents flowing in adjacent sections of the conductive path in the other of each first disc or each second disc are mutually opposite for all sections except for two sections on either side of a current feed point where they are the same;
magnetic flux in the one of each first disc or each second disc runs perpendicular to the faces of the discs in axially-extending flux paths, such that, considering each first disc independently of each second disc, the magnetic flux in one axially-extending flux path runs in an opposite direction to that in the immediately-adjacent flux paths on each side of it, and is returned by flux return portions of magnetic material provided at each end of the assembly;
magnetic flux in the other of each first disc or each second disc runs perpendicular to the faces of the discs in axially-extending flux paths, such that, considering each first disc independently of each second disc, the magnetic flux in one axially-extending path runs in an opposite direction to that in the immediately-adjacent flux paths on each side of it except for magnetic sectors bound by currents from a feed point, and is returned by the flux return portions of magnetic material provided at each end of the assembly; and in each case the total flux is the super-position of the flux of each first disc and each second disc, and
wherein the assembly comprises switching circuitry for progressively changing selected feed point connections in the other of each first disc or each second disc in correspondence to rotation thereof relative to the one of each first disc or each second disc in such a way as to effect continuous rotation of each first disc.

2. An axial flux motor assembly comprising:
a stack of first and second discs arranged alternately such that there is a gap allowing rotation between each disc, there being at least one first disc and at least one second disc in the stack;
each said first disc being mounted so as to be rotatable; and each said second disc being fixed in position;
wherein each of the first and second discs comprises sectors of magnetic material arranged on a face of the disc, between each of which sectors is a radially-extending section of a conductive path for conducting electric current, the sectors of magnetic material on each first disc being arranged at a first constant pitch, and the sectors of magnetic material on each second disc being arranged at a second constant pitch, where the said first and second constant pitches may or may not be equal; and
wherein, when electric current flows in the said radially-extending sections of the conductive path, magnetic flux runs perpendicular to the faces of the discs in axially-extending flux paths, and is returned by flux return portions of magnetic material provided at each end of the assembly, the total flux being the super-position of the flux of each first disc and each second disc, such that, considering each first disc independently of each second disc, the magnetic flux in one axially-extending flux path runs in an opposite direction to that in the immediately-adjacent flux paths on each side of it, except, in the case where the first and second pitches are not equal, for magnetic sectors on one of each first disc or each second disc which are bound by currents from a feed point;
the assembly further comprising switching circuitry operable (i) when the first and second pitches are equal, to reverse the direction of current flowing in the said conductive path in one of each first disc or each second disc in correspondence to rotation thereof relative to the other of each first disc or each second disc in such a way as to effect continuous rotation of each first disc, or (ii) when the first and second pitches are not equal, to progressively change selected feed point connections in the one of each first disc or each second disc in correspondence to rotation thereof relative to the other of each first disc or each second disc in such a way as to effect continuous rotation of each first disc;
wherein the said sectors of magnetic material comprise holes in the disc filled with high flux density soft magnetic material.

3. An axial flux motor assembly comprising:
a stack of first and second discs arranged alternately such that there is a gap allowing rotation between each disc, there being at least one first disc and at least one second disc in the stack;
each said first disc being mounted so as to be rotatable; and each said second disc being fixed in position;
wherein each of the first and second discs comprises sectors of magnetic material arranged on a face of the disc, between each of which sectors is a radially-extending section of a conductive path for conducting electric current, the sectors of magnetic material on each first disc being arranged at a first constant pitch, and the sectors of magnetic material on each second disc being arranged at a second constant pitch, where the said first and second constant pitches may or may not be equal; and wherein, when electric current flows in the said radially-extending sections of the conductive path, magnetic flux runs perpendicular to the faces of the discs in axially-extending flux paths and is returned by flux return portions of magnetic material provided at each end of the assembly, the total flux being the super-position of the flux of each first disc and each second disc, such that, considering each first disc independently of each second disc, the magnetic flux in one axially-extending flux path runs in an opposite direction to that in the immediately-adjacent flux paths on each side of it, except, in the case where the first and second pitches are not equal, for magnetic sectors on one of each first disc or each second disc which are bound by currents from a feed point;

the assembly further comprising switching circuitry operable (i) when the first and second pitches are equal, to reverse the direction of current flowing in the said conductive path in one of each first disc or each second disc in correspondence to rotation thereof relative to the other of each first disc or each second disc in such a way as to effect continuous rotation of each first disc, or (ii) when the first and second pitches are not equal, to progressively change selected feed point connections in the one of each first disc or each second disc in correspondence to rotation thereof relative to the other of each first disc or each second disc in such a way as to effect continuous rotation of each first disc;

wherein there are two such first discs and two such second discs, forming two groups each containing a first disc and a second disc adjacent to it, each set having its own flux return portions, and one group of the first and second discs has an angular offset with respect to the other group of the first and second discs equal to half the angular width of one of the said sectors.

4. An assembly as claimed in claim 1, 2, or 3, which is also operable to function as a generator.

5. An assembly as claimed in claim 4, wherein electrical current is delivered to the discs via an inductive coupler and/or electrical current is drawn from the discs via an inductive coupler.

6. An assembly as claimed in claim 2 or 3, wherein, when the first and second pitches are equal, the polarities of the currents flowing in adjacent sections of the conductive path when the assembly is in use are mutually opposite for all sections.

7. An assembly as claimed in claim 1, 2, or 3, wherein the magnitude of the current in the conductive path of each first disc is the same as that of the current in the conductive path of each second disc.

8. An assembly as claimed in claim 1, 2, or 3, wherein the conductive path is formed of a conductive winding.

9. An assembly as claimed in claim 1, 2, or 3, wherein each of the said first and second discs has a plurality of electrically-independent conductive paths.

10. An assembly as claimed in claim 1, 2, or 3, wherein electrical current is delivered to the discs via an inductive coupler.

11. An assembly as claimed in claim 1, 2, or 3, wherein there are two such first discs and two such second discs and either the first discs or the second discs are provided with two separate conductive paths.

12. An assembly as claimed in claim 1, wherein the number R of sectors of magnetic material on each first disc differs from the number S of sectors of magnetic material on each second disc, and the switching circuitry is operable to switch the feed points when each first disc has rotated by an angle equal to $720(1/R-1/S)$ degrees.

13. An assembly as claimed in claim 12, wherein R and S are even numbers.

14. An assembly as claimed in claim 1, 2, or 3, wherein each radially-extending section of the conductive path also extends through the disc in a direction transverse with respect to the faces of the disc and, measured at any radial position on the disc, the width of each of the conductive path sections at edge portions thereof adjacent to respective disc faces is narrower than the width of the conductive path section at a central portion thereof between the edge portions.

15. An assembly as claimed in claim 14, wherein, in the direction transverse to the faces of the disc, the central portion of the conductive path section has a substantially straight edge and each edge portion of the conductive path section has a substantially curved edge.

16. An assembly as claimed in claim 2 or 3, wherein, when the first and second pitches are not equal, the polarities of the currents flowing in adjacent sections of the conductive path in the one of each first disc or each second disc are mutually opposite for all sections except for two sections on either side of a current feed point where they are the same, and the polarities of the currents flowing in adjacent sections of the conductive path in the other of each first disc or each second disc are mutually opposite for all sections.

17. An assembly as claimed in claim 1 or 3, wherein the said sectors of magnetic material comprise holes in the disc filled with high flux density soft magnetic material.

18. An assembly as claimed in claim 1 or 2, wherein there are two such first discs and two such second discs, forming two groups each containing a first disc and a second disc adjacent to it, each set having its own flux return portions, and one group of the first and second discs has an angular offset with respect to the other group of the first and second discs equal to half the angular width of one of the said sectors.

* * * * *